(12) United States Patent
Haley

(10) Patent No.: US 10,515,342 B1
(45) Date of Patent: Dec. 24, 2019

(54) REFERRAL CANDIDATE IDENTIFICATION

(71) Applicant: Square, Inc., San Francisco, CA (US)

(72) Inventor: Elizabeth Haley, Mountain View, CA (US)

(73) Assignee: Square, Inc., San Francisco, CA (US)

( * ) Notice: Subject to any disclaimer, the term of this patent is extended or adjusted under 35 U.S.C. 154(b) by 126 days.

(21) Appl. No.: 15/630,769

(22) Filed: Jun. 22, 2017

(51) Int. Cl.
 *G06Q 10/10* (2012.01)
 *G06Q 20/22* (2012.01)
 *G06Q 20/20* (2012.01)

(52) U.S. Cl.
 CPC ......... *G06Q 10/1053* (2013.01); *G06Q 20/20* (2013.01); *G06Q 20/223* (2013.01)

(58) Field of Classification Search
 CPC ........ G06Q 50/18; G06Q 10/10; G06Q 10/00; G06Q 99/00; G06Q 30/08; G06Q 30/02; G06Q 10/02; G06F 17/30; G06F 13/00
 USPC .... 705/35, 301, 304, 311, 321, 346; 725/13, 725/45, 46
 See application file for complete search history.

(56) References Cited

U.S. PATENT DOCUMENTS

| | | | |
|---|---|---|---|
| 5,652,421 A | 7/1997 | Veeneman et al. | |
| 5,819,231 A | 10/1998 | Tremaine | |
| 5,878,337 A | 3/1999 | Joao et al. | |
| 5,960,411 A | 9/1999 | Hartman et al. | |
| 6,154,738 A | 11/2000 | Call | |
| 6,263,352 B1 | 7/2001 | Cohen | |
| 6,330,544 B1 | 12/2001 | Walker et al. | |
| 6,873,964 B1 | 3/2005 | Williams et al. | |
| 7,085,812 B1 | 8/2006 | Sherwood | |
| 7,155,411 B1 | 12/2006 | Blinn et al. | |
| 7,209,891 B1 | 4/2007 | Addy et al. | |
| 7,233,843 B2 | 6/2007 | Budhraja et al. | |

(Continued)

FOREIGN PATENT DOCUMENTS

| AU | 2017235924 A1 | 10/2017 |
|---|---|---|
| AU | 2018201228 A1 | 3/2018 |

(Continued)

OTHER PUBLICATIONS

Non-Final Office Action dated Jul. 14, 2016, for U.S. Appl. No. 14/160,490, of Moring, D., et al., filed Jan. 21, 2014.

(Continued)

*Primary Examiner* — Olusegun Goyea
(74) *Attorney, Agent, or Firm* — Lee & Hayes, P.C.

(57) ABSTRACT

This disclosure describes, at least in part, techniques for identifying referral candidates to provide referrals for applicants for employment vacancies for merchants. For instance, the techniques include systems and methods for identifying referral candidates, such as customers of the merchant, who have connections with an applicant for the employment vacancy for the merchant using various types of information, such as merchant transaction history, employment history, etc. The systems and methods may further include determining a strength of a connection between the referral candidates and the applicants, and use the strength of the connections to select referral candidates for referrals and/or weight the referrals provided. In various examples, the systems and methods provide the referrals, as well as other employment-relevant information for the applicant, to the merchant to help in determining whether to hire an applicant.

20 Claims, 5 Drawing Sheets

(56) References Cited

U.S. PATENT DOCUMENTS

| | | |
|---|---|---|
| 7,475,024 B1 | 1/2009 | Phan |
| 7,478,054 B1 | 1/2009 | Adams et al. |
| 7,493,390 B2 | 2/2009 | Bobde et al. |
| 7,552,087 B2 | 6/2009 | Schultz et al. |
| 7,575,166 B2 | 8/2009 | McNamara |
| 7,603,382 B2 | 10/2009 | Halt, Jr. |
| 7,764,185 B1 | 7/2010 | Manz et al. |
| 7,810,729 B2 | 10/2010 | Morley, Jr. |
| 7,818,809 B1 | 10/2010 | Sobel et al. |
| 7,870,028 B2 | 1/2011 | Kloubakov et al. |
| 8,001,057 B1 | 8/2011 | Hill |
| 8,060,259 B2 | 11/2011 | Budhraja et al. |
| 8,112,066 B2 | 2/2012 | Ayed |
| 8,266,551 B2 | 9/2012 | Boldyrev et al. |
| 8,401,710 B2 | 3/2013 | Budhraja et al. |
| 8,423,459 B1 | 4/2013 | Green et al. |
| 8,434,682 B1 | 5/2013 | Argue et al. |
| 8,442,208 B2 | 5/2013 | Shaffer et al. |
| 8,478,618 B2 | 7/2013 | Coleman et al. |
| 8,498,888 B1 | 7/2013 | Raff et al. |
| 8,577,810 B1 | 11/2013 | Dalit et al. |
| 8,601,002 B1 * | 12/2013 | Ali .................... G06F 16/24578 707/748 |
| 8,602,296 B1 | 12/2013 | Velline et al. |
| 8,630,586 B2 | 1/2014 | Dvortsov et al. |
| 8,676,119 B2 | 3/2014 | Cohen et al. |
| 8,855,312 B1 | 10/2014 | Hodgman et al. |
| 8,859,337 B2 | 10/2014 | Gaul et al. |
| 8,892,462 B1 | 11/2014 | Borovsky et al. |
| 8,972,298 B2 | 3/2015 | Kunz et al. |
| 9,064,249 B1 | 6/2015 | Borovsky et al. |
| 9,064,285 B1 | 6/2015 | Nathoo |
| 9,195,985 B2 | 11/2015 | Domenica et al. |
| 9,542,681 B1 | 1/2017 | Borovsky et al. |
| 9,652,751 B2 | 5/2017 | Aaron et al. |
| 9,704,146 B1 | 7/2017 | Morgan et al. |
| 9,721,251 B1 | 8/2017 | Jen et al. |
| 9,727,827 B2 * | 8/2017 | Hyder .................... G06Q 10/00 |
| 2002/0022982 A1 | 2/2002 | Cooperstone et al. |
| 2002/0091646 A1 | 7/2002 | Lake et al. |
| 2003/0014317 A1 | 1/2003 | Siegel et al. |
| 2003/0115285 A1 | 6/2003 | Lee et al. |
| 2003/0120531 A1 | 6/2003 | Parker |
| 2003/0204447 A1 | 10/2003 | Dalzell et al. |
| 2004/0030601 A1 | 2/2004 | Pond et al. |
| 2004/0193489 A1 | 9/2004 | Boyd et al. |
| 2004/0215520 A1 | 10/2004 | Butler et al. |
| 2005/0055582 A1 | 3/2005 | Bazakos et al. |
| 2005/0192823 A1 | 9/2005 | Kuhn et al. |
| 2005/0246245 A1 | 11/2005 | Satchell et al. |
| 2006/0047530 A1 * | 3/2006 | So .................... G06Q 10/1053 705/35 |
| 2006/0064373 A1 | 3/2006 | Kelley |
| 2006/0085333 A1 | 4/2006 | Wah et al. |
| 2006/0243798 A1 | 11/2006 | Kundu et al. |
| 2006/0261149 A1 | 11/2006 | Raghavendra |
| 2007/0038503 A1 * | 2/2007 | Krajcev .................. G06Q 10/02 705/301 |
| 2007/0039024 A1 * | 2/2007 | Krajcev .................. G06Q 10/02 725/46 |
| 2007/0069013 A1 | 3/2007 | Seifert et al. |
| 2007/0073619 A1 | 3/2007 | Smith |
| 2007/0208572 A1 | 9/2007 | Habichler et al. |
| 2007/0208930 A1 | 9/2007 | Blank et al. |
| 2007/0239468 A1 | 10/2007 | O'Brien et al. |
| 2007/0272734 A1 | 11/2007 | Lipton et al. |
| 2008/0035725 A1 | 2/2008 | Jambunathan et al. |
| 2008/0037442 A1 | 2/2008 | Bill |
| 2008/0040265 A1 | 2/2008 | Rackley, III et al. |
| 2008/0120129 A1 | 5/2008 | Seubert et al. |
| 2008/0133351 A1 | 6/2008 | White et al. |
| 2008/0177624 A9 | 7/2008 | Dohse |
| 2008/0197188 A1 | 8/2008 | Jagatic et al. |
| 2008/0262925 A1 | 10/2008 | Kim et al. |
| 2008/0277465 A1 | 11/2008 | Pletz et al. |
| 2008/0296978 A1 | 12/2008 | Finkenzeller et al. |
| 2008/0306750 A1 | 12/2008 | Wunder et al. |
| 2009/0070228 A1 | 3/2009 | Ronen |
| 2009/0094239 A1 | 4/2009 | Sabol et al. |
| 2009/0106138 A1 | 4/2009 | Smith et al. |
| 2009/0112766 A1 | 4/2009 | Hammad et al. |
| 2009/0144102 A1 | 6/2009 | Lopez |
| 2009/0210331 A1 | 8/2009 | Boone et al. |
| 2009/0271265 A1 | 10/2009 | Lay et al. |
| 2009/0288012 A1 | 11/2009 | Hertel et al. |
| 2009/0313132 A1 | 12/2009 | McKenna et al. |
| 2009/0319421 A1 | 12/2009 | Mathis et al. |
| 2010/0076777 A1 | 3/2010 | Paretti et al. |
| 2010/0082420 A1 | 4/2010 | Trifiletti et al. |
| 2010/0174596 A1 | 7/2010 | Gilman et al. |
| 2010/0211469 A1 | 8/2010 | Salmon et al. |
| 2010/0223145 A1 | 9/2010 | Dragt |
| 2010/0269059 A1 | 10/2010 | Othmer et al. |
| 2011/0047013 A1 | 2/2011 | McKenzie, III |
| 2011/0055084 A1 | 3/2011 | Singh |
| 2011/0071892 A1 | 3/2011 | Dickelman |
| 2011/0087550 A1 | 4/2011 | Fordyce, III et al. |
| 2011/0131105 A1 | 6/2011 | Aonuma et al. |
| 2011/0145052 A1 | 6/2011 | Lin et al. |
| 2011/0178883 A1 | 7/2011 | Granbery et al. |
| 2011/0180598 A1 | 7/2011 | Morgan et al. |
| 2011/0251892 A1 | 10/2011 | Laracey |
| 2011/0258014 A1 | 10/2011 | Evangelist et al. |
| 2011/0258689 A1 | 10/2011 | Cohen et al. |
| 2011/0302019 A1 | 12/2011 | Proctor, Jr. et al. |
| 2011/0302080 A1 | 12/2011 | White et al. |
| 2011/0313867 A9 | 12/2011 | Silver |
| 2011/0320345 A1 | 12/2011 | Taveau et al. |
| 2012/0011072 A1 | 1/2012 | Lodolo |
| 2012/0016731 A1 | 1/2012 | Smith et al. |
| 2012/0029990 A1 | 2/2012 | Fisher |
| 2012/0030044 A1 | 2/2012 | Hurst |
| 2012/0059701 A1 | 3/2012 | van der Veen et al. |
| 2012/0059758 A1 | 3/2012 | Carlson |
| 2012/0084210 A1 | 4/2012 | Farahmand |
| 2012/0089418 A1 | 4/2012 | Kamath et al. |
| 2012/0095867 A1 | 4/2012 | McKelvey |
| 2012/0095871 A1 | 4/2012 | Dorsey et al. |
| 2012/0110568 A1 | 5/2012 | Abel et al. |
| 2012/0150611 A1 | 6/2012 | Isaacson et al. |
| 2012/0150742 A1 | 6/2012 | Poon et al. |
| 2012/0185306 A1 | 7/2012 | Cheng |
| 2012/0209773 A1 | 8/2012 | Ranganathan |
| 2012/0244885 A1 | 9/2012 | Hefetz |
| 2012/0254031 A1 | 10/2012 | Walker et al. |
| 2012/0266258 A1 | 10/2012 | Tuchman et al. |
| 2012/0271725 A1 | 10/2012 | Cheng |
| 2012/0278727 A1 | 11/2012 | Ananthakrishnan et al. |
| 2012/0284036 A1 | 11/2012 | Evans |
| 2012/0290422 A1 | 11/2012 | Bhinder |
| 2012/0290609 A1 | 11/2012 | Britt |
| 2012/0296679 A1 | 11/2012 | Im |
| 2012/0323685 A1 | 12/2012 | Ullah |
| 2013/0006773 A1 | 1/2013 | Lutnick et al. |
| 2013/0024341 A1 | 1/2013 | Jeon et al. |
| 2013/0030889 A1 | 1/2013 | Davich et al. |
| 2013/0048719 A1 | 2/2013 | Bennett |
| 2013/0050080 A1 | 2/2013 | Dahl et al. |
| 2013/0054320 A1 | 2/2013 | Dorso et al. |
| 2013/0065672 A1 | 3/2013 | Gelman et al. |
| 2013/0066783 A1 | 3/2013 | Wolff |
| 2013/0067547 A1 | 3/2013 | Thavasi et al. |
| 2013/0073363 A1 | 3/2013 | Boal |
| 2013/0103574 A1 | 4/2013 | Conrad et al. |
| 2013/0103946 A1 | 4/2013 | Binenstock |
| 2013/0117329 A1 | 5/2013 | Bank et al. |
| 2013/0124333 A1 | 5/2013 | Doughty et al. |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0151613 A1 | 6/2013 | Dhawan et al. |
| 2013/0159154 A1 | 6/2013 | Purves et al. |
| 2013/0159172 A1 | 6/2013 | Kim |

(56) References Cited

U.S. PATENT DOCUMENTS

| | | |
|---|---|---|
| 2013/0159446 A1 | 6/2013 | Carlson et al. |
| 2013/0166402 A1 | 6/2013 | Parento et al. |
| 2013/0179227 A1 | 7/2013 | Booth et al. |
| 2013/0198018 A1 | 8/2013 | Baig |
| 2013/0204727 A1 | 8/2013 | Rothschild |
| 2013/0218721 A1 | 8/2013 | Borhan et al. |
| 2013/0225081 A1 | 8/2013 | Doss |
| 2013/0236109 A1 | 9/2013 | Madden et al. |
| 2013/0246207 A1 | 9/2013 | Novak et al. |
| 2013/0246280 A1 | 9/2013 | Kirsch |
| 2013/0246301 A1 | 9/2013 | Radhakrishnan et al. |
| 2013/0268431 A1 | 10/2013 | Mohsenzadeh |
| 2013/0290173 A1 | 10/2013 | Nemeroff |
| 2013/0290522 A1 | 10/2013 | Behm, Jr. |
| 2013/0291018 A1 | 10/2013 | Billings et al. |
| 2013/0297933 A1 | 11/2013 | Fiducia et al. |
| 2013/0301820 A1 | 11/2013 | Williams et al. |
| 2013/0311836 A1 | 11/2013 | Hurst et al. |
| 2013/0317835 A1 | 11/2013 | Mathew |
| 2013/0317950 A1 | 11/2013 | Abraham et al. |
| 2013/0325734 A1* | 12/2013 | Bixler ............... G06Q 10/1053 705/321 |
| 2013/0332385 A1 | 12/2013 | Kilroy et al. |
| 2013/0346223 A1 | 12/2013 | Prabhu et al. |
| 2014/0012754 A1 | 1/2014 | Hanson et al. |
| 2014/0019236 A1 | 1/2014 | Argue et al. |
| 2014/0025446 A1 | 1/2014 | Nagarajan et al. |
| 2014/0032382 A1 | 1/2014 | Hamann et al. |
| 2014/0057667 A1 | 2/2014 | Blankenship et al. |
| 2014/0058861 A1 | 2/2014 | Argue et al. |
| 2014/0081853 A1 | 3/2014 | Sanchez et al. |
| 2014/0081854 A1 | 3/2014 | Sanchez et al. |
| 2014/0096179 A1 | 4/2014 | Ben-Shalom et al. |
| 2014/0099888 A1 | 4/2014 | Flanagan et al. |
| 2014/0108245 A1 | 4/2014 | Drummond et al. |
| 2014/0114781 A1 | 4/2014 | Watanabe |
| 2014/0122345 A1 | 5/2014 | Argue et al. |
| 2014/0129135 A1 | 5/2014 | Holden et al. |
| 2014/0129302 A1 | 5/2014 | Amin et al. |
| 2014/0129357 A1 | 5/2014 | Goodwin |
| 2014/0129951 A1 | 5/2014 | Amin et al. |
| 2014/0136318 A1 | 5/2014 | Alberth, Jr. et al. |
| 2014/0156508 A1 | 6/2014 | Argue et al. |
| 2014/0180805 A1 | 6/2014 | Argue et al. |
| 2014/0184505 A1 | 7/2014 | Fullerton et al. |
| 2014/0201001 A1 | 7/2014 | Rellas et al. |
| 2014/0201100 A1 | 7/2014 | Rellas et al. |
| 2014/0207500 A1* | 7/2014 | Krajcev ............... G06Q 10/02 705/5 |
| 2014/0207669 A1 | 7/2014 | Rosenberg |
| 2014/0236762 A1 | 8/2014 | Gerber et al. |
| 2014/0249947 A1 | 9/2014 | Hicks et al. |
| 2014/0254820 A1 | 9/2014 | Gardenfors et al. |
| 2014/0257958 A1 | 9/2014 | Andrews |
| 2014/0258161 A1* | 9/2014 | Brown ............... G06Q 10/1053 705/321 |
| 2014/0278589 A1 | 9/2014 | Rados et al. |
| 2014/0279102 A1 | 9/2014 | Hartman et al. |
| 2014/0279184 A1 | 9/2014 | Lai et al. |
| 2014/0358803 A1* | 12/2014 | Carter ............... G06Q 50/18 705/311 |
| 2014/0379497 A1 | 12/2014 | Varma et al. |
| 2014/0379536 A1 | 12/2014 | Varma et al. |
| 2014/0379580 A1 | 12/2014 | Varma et al. |
| 2015/0025983 A1 | 1/2015 | Cicerchi |
| 2015/0112838 A1 | 4/2015 | Li et al. |
| 2015/0134439 A1 | 5/2015 | Maxwell et al. |
| 2015/0187021 A1 | 7/2015 | Moring et al. |
| 2015/0213413 A1* | 7/2015 | Faron ............... G06Q 10/1053 705/321 |
| 2015/0242922 A1 | 8/2015 | Zamer |
| 2015/0294312 A1 | 10/2015 | Kendrick et al. |
| 2015/0332223 A1 | 11/2015 | Aaron et al. |
| 2015/0332242 A1 | 11/2015 | Perry et al. |
| 2016/0071038 A1 | 3/2016 | Puttaswamy et al. |
| 2016/0217470 A1 | 7/2016 | Gerard et al. |
| 2016/0224205 A1 | 8/2016 | Fulton |
| 2016/0239806 A1* | 8/2016 | Benham ............. G06Q 10/1053 |
| 2017/0316382 A1 | 11/2017 | Colner |
| 2018/0260768 A1 | 9/2018 | Ng et al. |

FOREIGN PATENT DOCUMENTS

| | | |
|---|---|---|
| CA | 2 916 603 A1 | 12/2014 |
| CA | 2 930 186 A1 | 5/2015 |
| EP | 0 993 191 A2 | 4/2000 |
| GB | 2530451 A | 3/2016 |
| KR | 10-2006-0103089 A | 9/2006 |
| WO | 02/44981 A1 | 6/2002 |
| WO | 2014/210020 A1 | 12/2014 |
| WO | 2015/069389 A1 | 5/2015 |
| WO | 2015/100378 A1 | 7/2015 |
| WO | 2015/179316 A1 | 11/2015 |
| WO | 2016/011287 A1 | 1/2016 |
| WO | 2018/164839 A1 | 9/2018 |

OTHER PUBLICATIONS

Non-Final Office Action dated Jul. 21, 2016, for U.S. Appl. No. 14/329,638, of Aaron, P., et al., filed Jul. 11, 2014.
Non-Final Office Action dated Aug. 10, 2016, for U.S. Appl. No. 14/312,433, of Varma, A.K., et al., filed Jun. 23, 2014.
Final Office Action dated Sep. 1, 2016, for U.S. Appl. No. 14/062,617, of Templeton, T., et al., filed Oct. 24, 2013.
Non-Final Office Action dated Sep. 8, 2016, for U.S. Appl. No. 14/312,371, of Varma, A.K., et al., filed Jun. 23, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B., et al., filed Mar. 14, 2013.
Non-Final Office Action dated Sep. 22, 2016, for U.S. Appl. No. 14/182,655, of Spindel, N., et al., filed Feb. 18, 2014.
Examination Report No. 1 for Australian Patent Application No. 2014302661, dated Sep. 27, 2016.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Final Office Action dated Nov. 1, 2016, for U.S. Appl. No. 14/160,490, of Moring, D., et al., filed Jan. 21, 2014.
Final Office Action dated Nov. 10, 2016, for U.S. Appl. No. 13/830,350, of Morgan, T.B., et al., filed Mar. 14, 2013.
Non-Final Office Action dated Nov. 17, 2016, for U.S. Appl. No. 14/701,571, of Jen, M., et al., filed May 1, 2015.
Advisory Action dated Nov. 28, 2016, for U.S. Appl. No. 14/062,617, of Templeton, T., et al., filed Oct. 24, 2013.
Final Office Action dated Nov. 28, 2016, for U.S. Appl. No. 14/312,397, of Varma, A.K., et al., filed Jun. 23, 2014.
Final Office Action dated Nov. 29, 2016, for U.S. Appl. No. 14/088,113, of Maxwell, D.W., et al., filed Nov. 22, 2013.
Final Office Action dated Dec. 12, 2016, for U.S. Appl. No. 14/088,141, of Maxwell, D.W., et al., filed Nov. 22, 2013.
Examination Report No. 1 for Australian Patent Application No. 2014347192, dated Dec. 15, 2016.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examiner's Requisition for Canadian Patent Application No. 2,930,186, dated Jan. 30, 2017.
Examiner's Requisition for Canadian Patent Application No. 2,916,603, dated Feb. 9, 2017.
Notice of Acceptance for Australian Patent Application No. 2014347192, dated Feb. 16, 2017.
Corrected Notice of Allowance dated Feb. 27, 2017, for U.S. Appl. No. 14/329,658, of Aaron, P., et al., filed Jul. 11, 2014.

(56) References Cited

OTHER PUBLICATIONS

Notice of Allowance dated Mar. 2, 2017, for U.S. Appl. No. 13/829,080, of Morgan, T.B., et al., filed Mar. 14, 2013.
Non-Final Office Action dated Mar. 15, 2017, for U.S. Appl. No. 13/829,658, of Morgan, T.B., et al., filed Mar. 14, 2013.
Notice of Allowance dated Mar. 23, 2017, for U.S. Appl. No. 14/701,571, of Jen, M., et al., filed May 1, 2015.
Advisory Action dated Apr. 10, 2017, for U.S. Appl. No. 14/312,397, of Varma, A.K., et al., filed Jun. 23, 2014.
Non-Final Office Action dated Apr. 18, 2017, for U.S. Appl. No. 14/160,490, of Moring, D., et al., filed Jan. 21, 2014.
Final Office Action dated Apr. 19, 2017, for U.S. Appl. No. 14/312,433, of Varma, A.K., et al., filed Jun. 23, 2014.
Final Office Action dated Apr. 27, 2017, for U.S. Appl. No. 14/312,371, of Varma, A.K., et al., filed Jun. 23, 2014.
Non-Final Office Action dated Jun. 19, 2017, for U.S. Appl. No. 14/730,860, of Sasmaz, Y., et al., filed Jun. 4, 2015.
Advisory Action dated Jun. 30, 2017, for U.S. Appl. No. 14/312,433, of Varma, A.K., et al., filed Jun. 23, 2014.
Non-Final Office Action dated Jul. 10, 2017, for U.S. Appl. No. 13/830,350, of Morgan, T.B., et al., filed Mar. 14, 2013.
Advisory Action dated Jul. 11, 2017, for U.S. Appl. No. 14/312,371, of Varma, A.K., et al., filed Jun. 23, 2014.
Examination Report No. 1 for Australian Patent Application No. 2015264426, dated Jul. 11, 2017.
International Search Report and Written Opinion for International Application No. PCT/US2014/043891, dated Dec. 10, 2014.
International Search Report and Written Opinion for International Application No. PCT/US2014/058398, dated Dec. 24, 2014.
International Search Report and Written Opinion for International Application No. PCT/US2014/072269, dated Mar. 31, 2015.
International Search Report and Written Opinion for International Application No. PCT/US2015/031423, dated Aug. 13, 2015.
Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.
Non-Final Office Action dated Dec. 29, 2017, for U.S. Appl. No. 14/165,256, of Aaron, P., filed Jan. 27, 2014.
Examiner's Requisition for Canadian Patent Application No. 2,930,186, dated Jan. 11, 2018.
Final Office Action dated Jan. 22, 2018, for U.S. Appl. No. 13/830,350, of Morgan, T.B., et al., filed Mar. 14, 2013.
Examiner's Requisition for Canadian Patent Application No. 2,916,603, dated Feb. 15, 2018.
"Another eBay Band-Aid Fails to Fix the New Pricing Structure Flaws," posted on Oct. 18, 2008, Retrieved from the Internet URL: https://thebrewsnews.wordpress.com/2008/10/18/another-ebay-band-aid-fails-to-fix-the-new-pricing-structure-flaws/, pp. 1-4.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Merchantindustry.com—Best Merchant Services," Retrieved from internet URL: https://web.archive.org/web/20121020212419/http://www.merchantindustry.com/, on Dec. 30, 2015, pp. 1-7.
"Online Shopping," dated Nov. 2, 2014, Retrieved from the Internet URL: http://en.wikipedia.org/wiki/Online_shopping, on Nov. 10, 2014, pp. 1-12.
"Payment Gateway," Wikipedia, published May 30, 2014, Retrieved from the Internet URL: http://en.wikipedia.org/wiki/Pavment gateways, on Jun. 6, 2014, pp. 1-3.
"ProPay JAK Mobile Card Reader," Propay, published Dec. 27, 2011, Retrieved from the Internet URL: https://web.archive.org/web/20111227055421/https://www.propay.com/products-services/accept-payments/jak-card-reader, pp. 1-2.
"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.
"Verified by Visa Acquirer and Merchant Implementation Guide," U.S. Region, Visa Public, May, 2011, pp. 1-114.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L, "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Punch, L., "E-commerce: Just what does card-present mean these days," dated Oct. 1, 2012, Retrieved from the Internet URL: http://digitaltransactions.net/news/ story/ E-Commerce_-Just-What-Does-Card-Present-Mean-These-Days, on Feb. 17, 2015, pp. 1-4.
Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Non-Final Office Action dated Apr. 10, 2014, for U.S. Appl. No. 14/160,490, of Moring, D., et al., filed Jan. 21, 2014.
Non-Final Office Action dated May 29, 2014, for U.S. Appl. No. 13/837,562, of Chin, H.C.A., et al., filed Mar. 15, 2013.
Non-Final Office Action dated Aug. 27, 2014, for U.S. Appl. No. 14/165,256, of Aaron, P., filed Jan. 27, 2014.
Final Office Action dated Aug. 28, 2014, for U.S. Appl. No. 14/160,490, of Moring, D., et al., filed Jan. 21, 2014.
Advisory Action dated Nov. 18, 2014, for U.S. Appl. No. 14/160,490, of Moring, D., et al., filed Jan. 21, 2014.
Non-Final Office Action dated Dec. 1, 2014, for U.S. Appl. No. 14/062,617, of Templeton, T., et al., filed Oct. 24, 2013.
Non Final Office Action dated Dec. 15, 2014, for U.S. Appl. No. 14/312,397, of Varma, A.K, et al., filed Jun. 23, 2014.
Final Office Action dated Jan. 26, 2015, for U.S. Appl. No. 13/837,562, of Chin, H.C.A., et al., filed Mar. 15, 2013.
Notice of Allowance dated Feb. 20, 2015, for U.S. Appl. No. 14/513,076, of Borovsky, A., et al., filed Oct. 13, 2014.
Final Office Action dated Mar. 17, 2015, for U.S. Appl. No. 14/165,256, of Aaron, P., filed Jan. 27, 2014.
Non-Final Office Action dated Mar. 19, 2015, for U.S. Appl. No. 14/329,638, of Aaron, P., et al., filed Jul. 11, 2014.
Final Office Action dated Apr. 16, 2015, for U.S. Appl. No. 14/062,617, of Templeton, T., et al., filed Oct. 24, 2013.
Non-Final Office Action dated May 20, 2015, for U.S. Appl. No. 13/829,080, of Morgan, T.B., et al., filed Mar. 14, 2013.
Non-Final Office Action dated Jun. 11, 2015, for U.S. Appl. No. 14/692,655, of Borovsky, A., et al., filed Apr. 21, 2015.
Final Office Action dated Aug. 31, 2015, for U.S. Appl. No. 14/312,397, of Varma, A.K., et al., filed Jun. 23, 2014.
Final Office Action dated Sep. 17, 2015, for U.S. Appl. No. 13/829,080, of Morgan, T.B., et al., filed Mar. 14, 2013.
Non-Final Office Action dated Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/165,256, of Aaron, P., filed Jan. 27, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al. filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory Action dated Dec. 30, 2015, for U.S. Appl. No. 14/692,655, of Borovsky, A., et al., filed Apr. 21, 2015.

(56) References Cited

OTHER PUBLICATIONS

Non-Final Office Action dated Jan. 14, 2016, for U.S. Appl. No. 14/312,397, of Varma, A.K., et al., filed Jun. 23, 2014.
Non-Final Office Action dated Feb. 2, 2016, for U.S. Appl. No. 13/829,080, of Morgan, T.B., et al., filed Mar. 14, 2013.
Non-Final Office Action dated Feb. 23, 2016, for U.S. Appl. No. 14/062,617, of Templeton, T., et al., filed Oct. 24, 2013.
Non-Final Office Action dated Mar. 14, 2016, for U.S. Appl. No. 14/692,655, of Borovsky, A., et al., filed Apr. 21, 2015.
Final Office Action dated Apr. 13, 2016, for U.S. Appl. No. 14/165,256, of Aaron, P., filed Jan. 27, 2014.
Final Office Action dated Apr. 27, 2016, for U.S. Appl. No. 14/182,655, of Spindel, N., et al., filed Feb. 18, 2014.
Non-Final Office Action dated May 3, 2016, for U.S. Appl. No. 13/830,350, of Morgan, T.B., et al., filed Mar. 14, 2013.
Non-Final Office Action dated May 5, 2016, for U.S. Appl. No. 14/312,397, of Varma, A.K., et al., filed Jun. 23, 2014.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D.W., et al., filed Nov. 22, 2013.
Non-Final Office Action dated Jun. 8, 2016, for U.S. Appl. No. 14/088,141, of Maxwell, D.W., et al., filed Nov. 22, 2013.
Final Office Action dated Jun. 20, 2016, for U.S. Appl. No. 13/829,658, of Morgan, T.B., et al., filed Mar. 14, 2013.
Non-Final Office Action dated Oct. 28, 2014, for U.S. Appl. No. 14/334,422, of Nathoo, A., filed Jul. 17, 2014.
Notice of Allowance dated Feb. 18, 2015, for U.S. Appl. No. 14/334,422, of Nathoo, A., filed Jul. 17, 2014.
Non-Final Office Action dated Mar. 2, 2015, for U.S. Appl. No. 14/177,177, of Brock, Z., et al., filed Feb. 10, 2014.
Final Office Action dated Oct. 19, 2015, for U.S. Appl. No. 14/177,177, of Brock, Z., et al., filed Feb. 10, 2014.
First Examination Report for Australian Patent Application No. 2015289554, dated Feb. 21, 2017.
Examiner Requisition for Canadian Patent Application No. 2,955,452, dated Dec. 29, 2017.
Second Examination Report for Australian Patent Application No. 2015289554, dated Feb. 8, 2018.
Non-Final Office Action dated Feb. 28, 2018, for U.S. Appl. No. 14/754,909, of Tsou, V., filed Jun. 30, 2015.
Final Office Action dated Jul. 16, 2018, for U.S. Appl. No. 14/754,909, of Tsou, V., filed Jun. 30, 2015.
Examiner Requisition for Canadian Patent Application No. 2,955,452, dated Oct. 23, 2018.
International Search Report and Written Opinion for International Application No. PCT/US2015/040800, dated Oct. 30, 2015.
International Search Report and Written Opinion for International Application No. PCT/US2018/018950, dated Apr. 12, 2018.
Final Office Action dated Aug. 10, 2017, for U.S. Appl. No. 14/160,490, of Moring, D., et al., filed Jan. 21, 2014.
Final Office Action dated Sep. 15, 2017, for U.S. Appl. No. 14/182,655, of Spindel, N., et al., filed Feb. 18, 2014.
Examination Report No. 2 for Australian Patent Application No. 2014302661, dated Sep. 26, 2017.
Advisory Action dated Oct. 31, 2017, for U.S. Appl. No. 14/160,490, of Moring, D., et al., filed Jan. 21, 2014.
Non-Final Office Action dated Mar. 4, 2019, for U.S. Appl. No. 15/476,740 of Ho, V., et al., filed Mar. 31, 2017.
First Examination Report for Australian Patent Application No. 2018201228, dated Feb. 26, 2019.
Final Office Action dated Nov. 17, 2017, for U.S. Appl. No. 14/730,860, of Sasmaz, Y., et al., filed Jun. 4, 2015.
Notice of Allowance dated Nov. 24, 2017, for U.S. Appl. No. 13/829,658, of Morgan, T.B., et al., filed Mar. 14, 2013.
Non-Final Office Action dated Dec. 13, 2017, for U.S. Appl. No. 14/312,397, of Varma, A.K., et al., filed Jun. 23, 2014.

* cited by examiner

REFERRAL CANDIDATE IDENTIFICATION

BACKGROUND

Merchants that conduct transactions with customers for various items and services may develop relationships with various customers, and collect data for those customers. For example, during a transaction between a merchant and a customer, the merchant may use a point-of-sale (POS) device to input information associated with the transaction. The POS device may then send a request to a payment service to process the payment instrument for a price of the transaction. Thus, these merchants and/or payment services may obtain large amounts of information for the customers who perform transactions with these merchants, as well as information for employees of these merchants. Additionally, these merchants may develop relationships with the customers such that the customers become apprised with the business or culture of the merchants.

Merchants often have employment vacancies for various merchant locations, and may wish to determine whether applicants for the employment vacancies would be a good fit for the merchant or employment vacancy. Often times, the merchants may desire to obtain referrals for the applicants from other individuals, or other information indicating whether or not an applicant would be a good fit for the merchant or employment vacancy.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
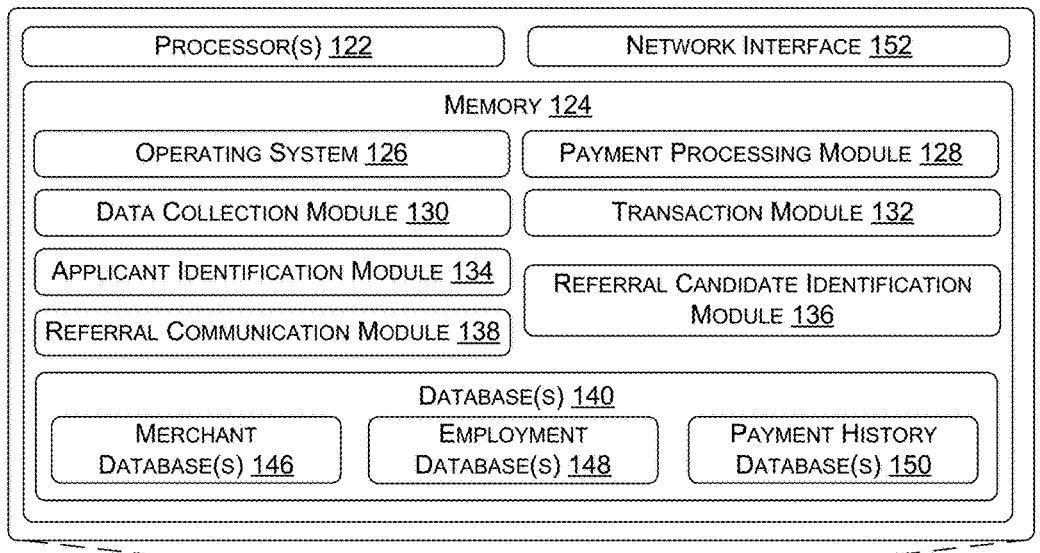
FIG. 1 illustrates an example environment in which techniques discussed herein may be implemented.
Figure 1:
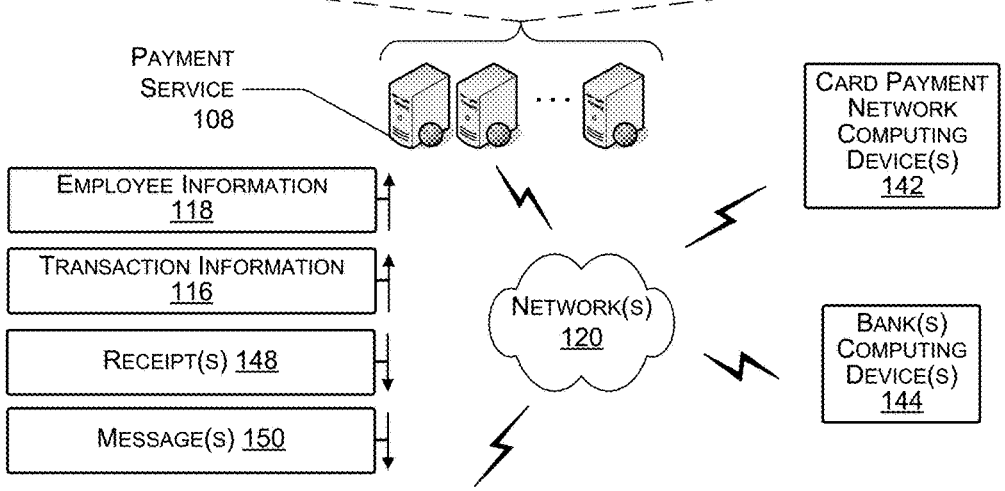
Figure 1:
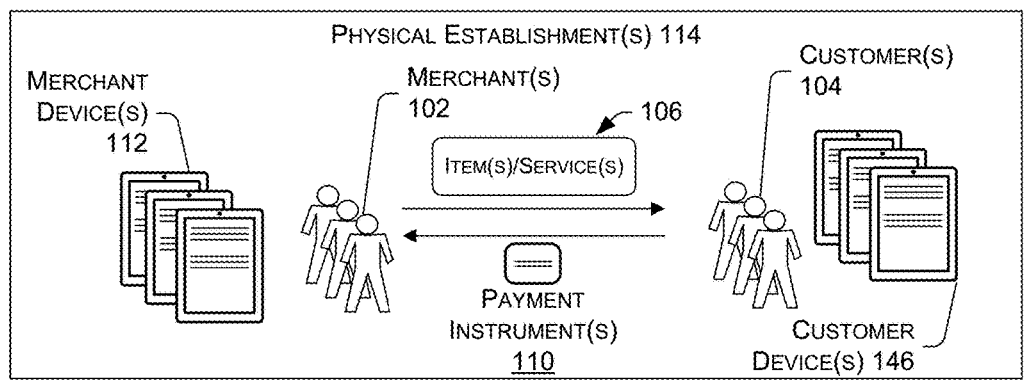

This disclosure describes, in part, techniques for identifying referral candidates to provide referrals for applicants for employment vacancies for merchants. In some examples, the referrals provided by the referral candidates may be used, along with other data about the applicants, to determine whether the applicants would be good employee candidates for an employment vacancy. In various examples, the referral candidates may be identified as having various connections with the applicant using information collected by the merchant and/or payment service.

In some instances, the payment service may offer a variety of services to help merchants streamline their businesses. For instance, the payment service may provide payment transaction services to enable merchants to perform transactions with customers using point-of-sale (POS) devices. The payment service may store information about these payment transactions between the merchants and the customers. Further, the payment service may store information about employees of the merchants, including employee evaluations, employee hours in a pay period, employment histories for employees, etc. The merchants and/or payment services may utilize this data, along with other sources of data, to identify referral candidates for employment vacancies of the merchants, and send referral communications to devices of the referral candidates.

In some examples, a merchant may receive applications from one or more applicants for an employment vacancy at a location of the merchant. In some examples, the merchant may receive these applications through different avenues. For example, merchant's may utilize digital receipts as forms of advertising for an employment vacancy, and receive names of potential applicants from customers of the merchant using the digital receipts. In other examples, the merchants may receive applications from applicants via email, online job posting sites, or other avenues.

In various examples, it may be advantageous to obtain additional information to determine whether an applicant would be a good hire for an employment vacancy. Often, referrals are a great source of information for merchants to determine whether an applicant would be a good fit for the vacancy. Further, referrals from customers of the merchants may be preferred as customers are often intimate with details of the business of the merchant, as well as the culture of the merchant. Accordingly, it may be advantageous to identify customers of a merchant as referral candidates for applicants for employment vacancies of the merchant.

In some examples, the merchant and/or payment service may obtain and store various information for the customers, employees, and applicants. For instance, the payment service may receive and store information regarding payment transactions between customers or applicants in a merchant transaction database. Further, the payment service may receive and store information regarding prior and current employees for various merchants in an employment history database. Using this information, and potentially other sources of information, referral candidates may be identified for applicants for employment vacancies of the merchants.

In some examples, connections may be identified between customers and applicants using payment transaction information stored in the merchant transaction database. For example, the payment transaction information may indicate various instances where a transaction between a customer and the merchant is performed within a short period of time (e.g., 30 seconds, 1 minutes, 5 minutes, etc.) from a transaction between the applicant and the merchant. If transactions between the merchant and each of the customer and applicant occur repeatedly, and close in time, it may be determined that the customer and applicant know each other and are performing activities together, such as dining together or shopping together. Alternatively, this may indicate that the customer and applicant have a similar schedule, such as waiting in line at the same time in a coffee shop each morning. In such instances, the merchant and/or payment service may use this information to determine that the customer has some connection to the applicant and is a candidate to provide a referral to the merchant about the applicant.

In other examples, the merchant and/or payment service may identify various connections between a customer and an applicant using employment histories of the customer and applicant stored in the employment history database. For example, the employment histories for each of the customer and applicant may indicate that the same merchant employed the customer and applicant simultaneously for a period of time. In other examples, the employment histories may indicate that either the customer or applicant was an employee at a particular merchant location where the other of the customer or applicant had previously made transactions. In this way, the merchant and/or payment service may determine that the customer has some connection to the applicant and is a referral candidate for providing a referral to the merchant.

In some examples, upon identifying a referral candidate, the merchant and/or payment service may send a referral request to a device associated with the referral candidate. However, in other examples, referral candidates may further be selected to provide a referral, or have their referral ranked, based on various factors indicating a strength of their referral. For example, a referral candidate may be selected to provide a referral based on a strength of a connection between the referral candidate and the applicant. In some instances, the longer the connection has existed, the stronger the connection between the referral candidate and the applicant. For example, if a connection between one referral candidate has existed for longer periods of time (e.g., 5 years, 10 years, etc.), that referral candidate may be selected and/or weighted more heavily compared to another referral candidate having a connection of shorter lengths of time (e.g., 1 week, 1 month, etc.). As another example, a referral candidate may be selected, or have their referral weighted more heavily, if the connection between the referral candidate and the applicant is an employment connection, such as the referral candidate being a co-worker with or boss to the applicant. For instance, a co-worker or boss may provide a better employment referral for an applicant than a friend of the applicant.

The payment service may receive the referral from the referral candidate, and provide the referral to the merchant. In some examples, the merchant and/or payment service may determine or provide other information regarding whether the applicant would be a good fit for the employment vacancy. For example, the payment service may analyze an employment history of the applicant to determine how much, if any, experience the applicant has that is pertinent to the employment vacancy. As another example, the payment service may analyze payment transactions of the applicant to determine when the applicant is most active. For instance, if an applicant commonly performs transactions earlier in the morning, then the applicant may be a good fit for a morning shift employment vacancy, and conversely, if the applicant is commonly performing transactions late at night, the applicant may not be a good fit for a morning shift vacancy.

In various industries, other payment transaction information may be utilized to determine whether the applicant would be a good fit for an employment vacancy. For instance, in a service industry where tips are often given (e.g., barista, waiter, etc.), tipping patterns and behaviors of the applicant may be used to determine whether the applicant would be a good fit. If the applicant gives large tips to people serving on them, this may suggest they appreciate good service and would be a good fit for a service-based employment vacancy. As another example, if the applicant varies their tips (e.g., sometimes tips well, sometimes tips poorly), this may indicate that the applicant appreciates good services and is a sophisticated tipper based on how the service is. This may indicate that the applicant would be a good fit for a service-based employment vacancy.

Upon obtaining one or more referrals and/or additional information for determining whether an applicant would be a good fit for an employment vacancy, the payment service may send an indication of this information to a merchant device associated with the merchant. For example, the payment service may send the referrals, along with indications of other information that suggest the applicant would be a good fit for the employment vacancy. In other examples, the payment service may retain certain details or information of the applicant for privacy reasons. For instance, the payment service may provide an indication that an applicant would not be a good fit for a morning shift position based on late-night spending habits of the applicant, but refrain from telling the merchant exactly why the applicant would not be a good fit. In some instances, the payment service may determine, based on the referrals and/or other information, that the applicant is worth hiring or at least worth giving an interview to.

Various aspects of the techniques described herein can offer new, efficient, and intelligent channels for a merchant to identify strong applicants by identifying referral candidates and other qualification information for an applicant. In some cases, the techniques described herein may allow for merchants to identify referral candidates for applicants and other employment-relevant information about applicants without the use of other employees (e.g., managers, human resource employees, etc.) or of third-parties, such as agents or recruiters. The disclosed methods and systems also increases the ability for merchants to identify applicants who are a good fit for positions using referrals from customers who are aware of business details and the business culture for the merchant. The disclosed methods and systems can operate in both real-time and offline modes. Embodiments of the present subject matter are configured to operate regardless of the kind of mobile device, web applications, mobile applications, POS topologies, payment cards, computer networks, and environments.

In some examples, the techniques described herein may be unique to certain technological environments. For instance, the types of data collected and analyzed may not be collected using techniques outside the realm of digital or electronic transactions. The techniques may be rooted in computer technology to solve the problem of identifying candidates using information that is otherwise inaccessible to merchants, such as transactional information, former employment information, etc. Additionally, the techniques described herein may identify referral candidates using much less computational time and computational resources compared to prior art methods, which may require separate services and vendors, by automating the identification of referral candidates using information that is readily available through the payment service.

FIG. 1 illustrates an example environment 100 that includes one or more merchants 102 conducting transactions with one or more customers 104 for one or more items/services 106, as well as a payment service 108 to authorize one or more payment instruments 110 of the customer(s) 104 for the transactions. The example environment 100 illustrates interactions between the merchant(s) 102, customer(s) 104, and payment service 108 for collecting various data, identifying applicants for employment vacancies associated with the merchant(s) 102, and determining referral candidates for the applicants.

In some examples, the process of obtaining data associated with customer(s) 104, employees of the merchant(s) 102, and other types of data, is initiated at or by one or more merchant devices 112. As used in herein, merchant device(s)

112 may comprise any sort of mobile or non-mobile devices (e.g., electronic device(s)) that include instances of application(s) that execute on the respective merchant device(s) 112. The application(s) may provide POS functionality to the merchant device(s) 112 to enable merchant(s) 102 (e.g., owners, employees, etc.) to at least accept payments from the customer(s) 104. In some types of businesses, the merchant device(s) 112 may correspond to a store or other place of business of the merchants, and thus, may be a fixed location that typically does not change on a day-to-day basis. In other types of businesses, however, the location of the merchant device(s) 112 may change from time to time, such as in the case that the merchant(s) 102 operate a food truck, is a street vendor, is a cab driver, etc., or has an otherwise mobile business, e.g., in the case the merchant(s) 102 sell items at buyer's homes, places of business, and so forth. In either of the examples above, the place of business of the merchant(s) 102 may be referred to as a merchant location or a physical establishment(s) 114. It should be noted that, in some instances, the merchant(s) 102 may be conducting transaction with customer(s) 104 outside of physical establishment(s) 118. For instance, the customer(s) 104 may be using respective electronic device(s) to purchase item(s)/service(s) 106 from merchant(s) 102 via e-commerce businesses associated with the merchant(s) 102.

Additionally, as used herein, a merchant 102 (also referred to as an "entity") may include any business engaged in the offering of items (e.g., goods) or services for acquisition by customer(s) 104. Actions attributed to a merchant 102 may include actions performed by owners, employees, or other agents of the merchant 102, and thus no distinction is made herein unless specifically discussed. In addition, as used herein, a customer 104 may include any entity that acquires items or services from a merchant 102, such as by purchasing, renting, leasing, borrowing, licensing, or the like. Hereinafter, items and/or services offered by merchants 102 may be referred to solely as items. Thus, a merchant 102 and a customer 104 may interact with each other to conduct a transaction in which the customer 104 acquires an item from a merchant 102, and in return, the customer 104 provides payment to the merchant 102.

As used herein, a transaction may include a financial transaction for the acquisition or obtaining of items and/or services that is conducted between customer(s) 104 and merchant(s) 102. For example, when paying for a transaction, the customer 104 can provide the amount that is due to the merchant 102 using cash or other payment instrument 110 (e.g., a debit card, a credit card, a stored-value or gift card, a check, through an electronic payment application on a device carried by the customer 104, or the like). The merchant 102 can interact with the merchant device(s) 112 to process the transaction, such as by inputting (e.g., manually, using a magnetic card reader or an RFID reader, etc.) identifiers (e.g., payment information, such as a card number, account number, or any other account information) associated with the payment instrument 110. For example, a payment instrument 110 of the customer 104 may include one or more magnetic strips for providing card and customer information when swiped in a card reader. In other examples, the payment instrument 110 may include other types of payment cards may be used, such as smart cards having a built-in memory chip that is read by the device when the card is "dipped" into the reader, a radiofrequency identification tag, or so forth.

In various examples, the merchant device(s) 112 may send transaction information 116 and employee information 118 to the payment service 108 over one or more networks 120. In some examples, the transaction information 116 may generally represent details involving a payment transaction between the merchant(s) 102 and customer(s) 104.

During a transaction between a merchant 102 and a customer 104, the merchant device(s) 112 can determine the transaction information 116 describing the transaction, such as the payment information of the payment instrument 110, an amount of payment received from the customer 104, the item(s)/service(s) 106 acquired by the customer 104, a time, place and date of the transaction, a card network associated with the payment instrument 110, an issuing bank of the payment instrument 110, a name of the customer 104, a name or other identifier for an employee who interacted with a customer(s) 104 for a particular transaction, indications of tip amounts for the purchase transactions, and so forth. The merchant device(s) 112 can send the transaction information 116 to the payment service 108 over the network(s) 120, either substantially contemporaneously with the conducting of the transaction (in the case of online transactions) or later when the device is in the online mode (in the case offline transactions).

In various examples, the merchant device(s) 112 may send employee information 118 associated with their employees. For example, the merchant device(s) 112 may send in a batch process, continuously, or at regularly scheduled intervals, employee information 118 including who their employees are, what hours their employees work, what shifts their employees work or are scheduled to work, which physical establishments(s) 114 of the merchant(s) 102 the employees work at for their shifts, which transactions individual employees processed (and thus which customer(s) 104 the employees interacted with), and other data associated with employees. The merchant device(s) 112 may send the employee information 118 over the network(s) 120 to the payment service 108.

The payment service 108 may include one or more processors 122 and memory 124, which may store an operating system 126, a payment processing module 128, a data collection module 130, a transaction module 132, an applicant identification module 134, a referral candidate identification module 136, a referral communication module 138, and database(s) 140. The payment processing module 128 may function to receive the transaction information 116 regarding the transaction from the merchant device(s) 112 and attempt to authorize the payment instrument 110 used to conduct the transaction. The payment processing module 128 may then send an indication of whether the payment instrument 110 has been approved or declined back to the merchant device(s) 112.

Generally, when a merchant 102 and a customer 104 enter an electronic payment transaction, the transaction is processed by electronically transferring funds from a financial account associated with the customer 104 to a financial account associated with the merchant 102. As such, the payment processing module 128 may communicate with one or more computing devices of a card network (or "card payment network") 142, e.g., MasterCard®, VISA®, over the network 120 to conduct financial transactions electronically. The payment processing module 128 can also communicate with one or more computing devices of one or more banks 144, processing/acquiring services, or the like over the network 120. For example, the payment processing module 128 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment instrument(s) 110 to customer(s) 104, and may pay acquiring banks for purchases made by customer(s) 104 to which the issuing bank has issued the payment instrument(s) 110. Accordingly, in some examples, the computing device(s) of an acquiring bank may be included in the card payment network and may communicate with the computing devices of a card-issuing bank to obtain payment. Further, in some examples, a customer 104 may use a debit card instead of a credit card, in which case, the bank computing device(s) of a bank corresponding to the debit card may receive communications regarding a transaction in which the customer 104 is participating. Additionally, there may be computing devices of other financial institutions involved in some types of transactions or in alternative system architectures, and thus, the foregoing are merely several examples for discussion purposes.

In the example environment 100 of FIG. 1, the data collection module 130 of the payment service 108 may receive various types of data from the merchant(s) 112 and store the data in the database(s) 140. The database(s) 140 may be stored at one location, or across different physical locations and comprise any number of databases. The data collection module 130 may receive the transaction information 116 from the merchant(s) 112 and store it in one or more merchant databases 146. The transaction information 116 may comprise any type of information collected during transactions between merchant(s) 102 and customer(s) 104, including, but not limited to, the payment information of the payment instrument 110, an amount of payment received from the customer 104, the item(s)/service(s) 106 acquired by the customer 104, a time, place and date of the transaction, a card network associated with the payment instrument 110, an issuing bank of the payment instrument 110, a name of the customer 104, a name or other identifier for an employee who interacted with a customer(s) 104 for a particular transaction, indications of tip amounts for the purchase transactions, and so forth. The transaction information 116 may be stored in the merchant database(s) 146 with indications of with which merchant(s) 146 each transaction was performed.

In some examples, the data collection module 130 may further receive the employee information 118 from the merchant(s) 102. The employee information 118 may generally comprise any type of information associated with employees of the merchant(s) 102, such as who their employees are, what hours their employees work, what shifts their employees work or are scheduled to work, which physical establishments(s) 114 of the merchant(s) 102 the employees work at for their shifts, which transactions individual employees processed (and thus which customer(s) 104 the employees interacted with), and other data associated with employees. The data collection module 130 may then store the employee information 118 in one or more employment databases 148. The data collection module 130 may further store indications of by which merchant(s) 112 the employees are employed.

In various examples, the payment service 108 may include a transaction module 132 or service which may include systems and applications for users to send and receive money between each other. For example, the transaction module 132 may provide a service (e.g., Square Cash, PAYPAL®, etc.) that facilitate online transactions between accounts of users, such as customer(s) 104. In such examples, the data collection module 130 may store data associated with those transactions in one or more payment history databases 150. In some examples, the payment history database(s) 150 may comprise peer-to-peer (P2P) payment history database(s) 150 and store information for transactions made from one person to another through an intermediary. For instance, the data collection module 130 may store data such as users who performed exchanges with each other, dates and times when the exchanges occurred, amounts involved in the exchanges, reasons for the exchange that were input by the users, and other data associated with monetary exchanges.

In some examples, the applicant identification module 134 may perform various techniques for identifying applicants for an employment vacancy of a merchant(s) 102. In some instances, this may include the use of digital receipts. For instance, the techniques for identifying applicants may include identifying employment vacancies for a merchant(s) 102, receiving an indication of a payment transaction between the merchant(s) 102 and the customer(s) 104, determining a physical establishment(s) 114 for the transaction, identifying an employment vacancy at that location (or another location), and generating an interactive digital receipt (e.g., receipts 148) for the transaction which includes details of the payment transaction along with an indication of an employment vacancy. In this way, when the customer(s) 104 signs their digital receipt 150, the customer(s) 104 may further write down an indication of a candidate for the employment vacancy. Thus, customer(s) 104 may provide applicants for employment vacancies using digital receipts, and merchant(s) 104 may build a pool of applicants for an employment vacancy using customer(s) 104 who may know of friends that would be a good fit for the vacancy, and who may know the details and culture of the business of the merchant(s) 102. In other examples, the applicant identification module 134 may identify applicants for an employment vacancy of the merchant(s) 102 using other means, such as online postings, websites where users indicate they are looking for jobs of employers indicate they are hiring (INDEED®, CRAIGSLIST®, etc.), emails, text messages, phone calls, or any other means of obtaining applications from applicants.

In some examples, the applicant identification module 134 may further filter (e.g., remove) applicants from consideration, and/or rank or otherwise evaluate candidates based on information stored in the database(s) 140, or other information. For example, the applicant identification module 130 may determine various parameters associated with the employment vacancy, such as an industry of the merchant(s) 102, a job description or job duties, shift times or hours when the applicants would work for the vacancy, physical establishment(s) 114 for the vacancy, or other data regarding the employment vacancy. The applicant identification module 134 may then determine other types of data associated with the applicants.

In some examples, the applicant identification module 134 may analyze the merchant database(s) 146 to determine various transaction information 116 for the applicants, and use that transaction information 116 to determine if an applicant is a good fit for the employment vacancy. For example, if the employment vacancy is a morning shift for the merchant(s) 102, then applicants who have transactions at early morning hours and/or lack of transactions at late night hours may be good candidates for the morning shift (and vice-versa for a night shift). In some examples, applicants who often perform transactions late at night (e.g., 12:00 am, 1:30 am, etc.) may not be good candidates for the employment vacancy.

In some examples, the applicant identification module 134 may determine various tipping habits using the data stored in the merchant database(s) 146 and determine whether an applicant would be a good fit for the vacancy based on the tipping habits. In some industries, especially service industries, tipping is often associated with quality of service. Thus, if an employment vacancy is in a service industry, tipping habits may be useful to determine whether an applicant would be a good fit for a vacancy. For instance, if the applicant consistently tips well (e.g., above 15%, above 20%, etc.), this may indicate that the applicant appreciates service industry jobs and would be a good candidate to work at this position. Conversely, an applicant who consistently tips poorly may be a bad fit for a position as they do not appreciate service industry jobs, and not have the work ethic and/or motivation to perform for this particular vacancy. In some instances, variable tipping amounts may suggest the applicant is a savvy or sophisticated customer who rewards good service, and does not reward poor service. This may further indicate that the applicant would be a good fit for a service industry type position. While tipping habits may be of particular interest for jobs in the service industry, the tipping habits may be useful to show the general character of an applicant.

The applicant identification module 134 may further filter and/or evaluate (e.g., rank, weight, etc.) applicants for the vacancy based on the employee information 118 collected and stored in the employment database(s) 148. For example, if a particular candidate shows prior employment/work experience in an industry associated with the vacancy, this may show that the candidate would be a good fit for the position, and the rank of that candidate may improve. For instance, an applicant who worked at a coffee shop previously may be a good candidate for a barista position. In some examples, the amount of jobs an applicant has had over a period of time may indicate that the candidate would be a good or bad fit for the vacancy. For instance, if the employment database(s) 148 indicate that the applicant has had a large amount of jobs (e.g., 3, 5, etc.) in a short span of time (e.g., 3 months, 6 months, 1 year, etc.), this may indicate that the candidate is not loyal, does not get along with other employees or management, or any number of other reasons to not hire this applicant. Conversely, longevity in prior employment may indicate a candidate is a good fit for a position and would be a good employee. Further, in some examples the employment database(s) 148 may include feedback or reviews for applicants that were submitted by customer(s) 104 who interacted with the applicants at prior jobs. Positive evaluations may indicate that a candidate would be a good hire for the merchant(s) 102, and poor evaluations might indicate that the candidate would not be a good hire for the merchant(s) 102.

Upon evaluating information available, the applicant identification module 134 may either remove an applicant from consideration for the vacancy, or rank or otherwise evaluate the candidate. For instance, the applicant identification module 134 may have a scale (e.g., 1 to 10, 1 to 100, etc.) that it uses to evaluate or rank candidates. The various factors described above may be weighted and used to determine a number on the scale to evaluate the candidates. Based on the evaluation of the candidate, the candidate may be ranked with other candidates. In some examples, the applicant identification module 134 may simply output a "yes" or "no" indication which suggests that the merchant(s) 102 should hire the applicant, or at least interview the applicant.

Often, referrals for applicants from users, especially from customer(s) 104 of the merchant(s), may be particularly helpful to determine whether an applicant is a good fit for an employment vacancy. However, applicants may list only referral candidates on their applications who they know will give good referrals, or not list any referral candidates. Accordingly, the referral candidate identification module 136 may use the information stored in the database(s) 140 to identify referral candidates for the applicants.

In some examples, the referral candidate identification module 136 may analyze the transaction information 116 stored in the merchant database(s) 146 to identify referral candidates for an applicant. For example, the referral candidate identification module 136 may analyze the merchant database(s) 146 to identify transactions between an applicant and a merchant(s) 102 at a particular physical establishment(s) 114 that occur within a threshold period of time (e.g., 1 minute, 5 minutes, 10 minutes, etc.) from a transaction between a customer(s) 104 and the same merchant(s) 102. In some examples, the referral candidate identification module 136 may determine that transactions between the merchant(s) 102 and the customer(s) 104 as well as the applicant occur not only within a threshold period of time, but that this occurrence has happened more than once. In some examples, this may indicate that the customer(s) 104 and the applicant often meet to have meals out together, or shop together, as they are each performing transactions with the same merchant(s) within a relatively short period of time. In some examples, this may illustrate that the customer(s) 104 and applicant have similar schedules and buy coffee at the same time each morning at the same shop, and have had the chance to talk with each other and get to know each other. This may indicate that the customer(s) 104 and the applicant have a connection, such as friends, family members, co-workers, etc., and also serve as an indicator of the strength of the connection. Thus, using the information stored in the merchant database(s) 146, the referral candidate identification module 136 may identify a referral candidate for an applicant for a vacancy of a merchant(s) 102.

Some of the above noted the examples, and following examples, of identifying a referral candidate for an applicant illustrate that a customer(s) 104 of the particular merchant(s) 102 is interacting with the applicants. However, in other examples any user or individual (whether or not they are a customer of the merchant(s) 102 who has the employment vacancy) may be determined to have a connection with the applicant, and identified by the referral candidate identification module 136 as being a referral candidate for the applicant.

In some instances, the referral candidate identification module 136 may analyze information stored in the employment database(s) 148 to identify referral candidates for an applicant. For example, the referral candidate identification module 136 may determine, based on the employee information 118 stored in the employment database(s) 148, that a customer(s) 104 was an employee for a particular merchant(s) 102 at a same time as an applicant was an employee for the same merchant(s) 102. Thus, the referral candidate identification module 136 may identify a connection between the applicant and customer(s) 104 based on them working for the same employer, and possibly at the same physical establishment(s) 114.

In some examples, the referral candidate identification module 136 may use both the information stored in the merchant database(s) 146 along with information stored in the employment database(s) 148 to identify a connection between an applicant and a customer(s) 104 or other individual. For example, the referral candidate identification module 136 may determine that the applicant is an employee at a location at which the customer(s) 104 (or other individual) has made a transaction, or that the customer(s) 104 is an employee at a location at which the applicant has made a transaction. Thus, the referral candidate identification module 136 may identify a connection between the applicant and the customer(s) 104 because they have performed a transaction with each other one or more times.

In some examples, the referral candidate identification module 136 may use information stored in the peer-to-peer (P2P) payment history database(s) 150 maintained by the payment service provider in order to identify referral candidates who have connections with an applicant. For example, if a customer(s) 104 has exchanged money with an applicant using the transaction module 132, then that customer(s) 104 may be identified as having a connection to the applicant because they know each other well enough to exchange money, and may be further identified as a referral candidate for the applicant.

In various examples, information from resources other than that stored in the database(s) 140 may be used by the referral candidate identification module 136 to identify referral candidates for an applicant. For example, the referral candidate identification module 136 may analyze various social media sites (e.g., FACEBOOK®, LINKEDIN®, etc.) to identify connections between individuals (e.g., customer(s) 104) and applicants for an employment vacancy, and identify the individuals as referral candidates. In various examples, the referral candidate identification module 136 may analyze geo-location information for devices associated with an applicant and other individuals to determine that a device of an applicant has been in a same geo-graphic proximity to a device associated with an individual for longer than a threshold period of time, and/or for more than a threshold number of times. This may indicate that the individual and the applicant know each other, or frequent the same locations (e.g., the same coffee shop, the same bookstore, etc.) and have a connection. These examples illustrate some ways the referral candidate identification module 136 may identify referral candidates for an applicant.

In some examples, the referral candidate identification module 136 may further determine a strength of a connection between an applicant and an individual (e.g., customer(s) 104) identified as being connected to the applicant. In some examples, the strength of connection may indicate how strong an individual is as a referral candidate. For instance, the referral candidate identification module 136 may analyze information in the database(s) 140 to determine a length of time that the connection has existed. If the connection has existed for a longer period of time (e.g., 2 years, 5 years, 10 years, etc.), then the connection may be identified as stronger than a connection existing for a shorter period of time (e.g., 1 week, 1 month, etc.). As another example, if the applicant and individual were identified as having a connection based on being employees at a same time for a same merchant(s) 102, then the various positions may indicate a strength of the connection, or that the individual is a strong referral candidate, if the individual was a boss of the applicant, and thus knows the applicant's work ethic and character. A current or former boss of an applicant may be a stronger connection than a friend or acquaintance of the applicant. In some examples, the referral candidate identification module 136 may determine that the referral candidate has experience in an industry associated with the employment vacancy, which indicates a strong referral candidate. For instance, if the employment vacancy is for a chef at a restaurant, and the connected referral candidate is a chef at another restaurant, this may indicate a strong referral candidate. Further, if the chef at the other restaurant has been a chef for many years, this may even further indicate a strong referral candidate as they are very experienced in the food preparation industry.

Based on the strength of the connection, or the strength of the referral candidate, the referral candidate identification module 136 may determine to withhold, or extend a referral request to the particular connected referral candidate. In some examples, the referral candidate identification module 136 may rank or weight the referrals received from various referral candidates based on the strength of connection or the strength of the referral candidate. For example, a referral from a former boss of the applicant may be ranked higher or weighted more than a referral from a friend or family member of the applicant.

In various examples, the referral communication module 138 may send referral requests, and receive referrals, from devices (e.g., customer device(s) 146) associated with the identified referral candidates (e.g., customer(s) 104). The referral candidate identification module 136 may determine whether or not to send referral requests to the referral candidates based on the strength of the connection or strength of the referral candidate determined by the referral candidate identification module 136. Upon receiving the referrals from the referral candidates, the referral candidate identification module 136 may rank, weight, or list the referrals from the referral candidates based on the strength of the connection or strength of the referral candidate determined by the referral candidate identification module 136. For example, the referral communication module 138 may output one or more messages 150 to the merchant device(s) 112 indicating rankings of referrals. In some examples, the message(s) 150 may further include various information from the database(s) 140 that were used by the payment service 108 to identify the referral candidates and/or to determine whether the applicants would be a good fit for the position. In some instances, the referral communication module 138 may send the message(s) 150 which in turn cause one or more user interfaces to be presented on a display of the merchant device(s) 112. The interfaces may indicate various types of information, such as the referrals, the referral candidates who provided the referrals, the connections and/or strength of connections between the referral candidates and the applicant, information analyzed to determine that the applicant would be a good fit for the employment vacancy, an indication of whether the merchant(s) 102 ought to interview and/or hire the applicant, etc.

In the example of FIG. 1, the payment service 108 further includes one or more network interfaces 152 for communicating over the network(s) 120. The network interface(s) 152, along with any other network interface(s) described herein, may include one or more interfaces and hardware components for enabling communication with various other devices over the network 120 or directly. For example, network interface(s) 152 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

As discussed herein, processor(s), such as processor(s) 122, may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory, such as memory 124, may be an example of tangible non-transitory computer storage media and may include volatile and nonvolatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology. Further, in some cases, devices, such as merchant device(s), the payment service 108, a customer device, or the like, can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

Additional functional components of the payment service 108 may include an operating system 126 for controlling and managing various functions of the payment service 108 and for enabling basic user interactions with the payment service 108.

Figure 2:
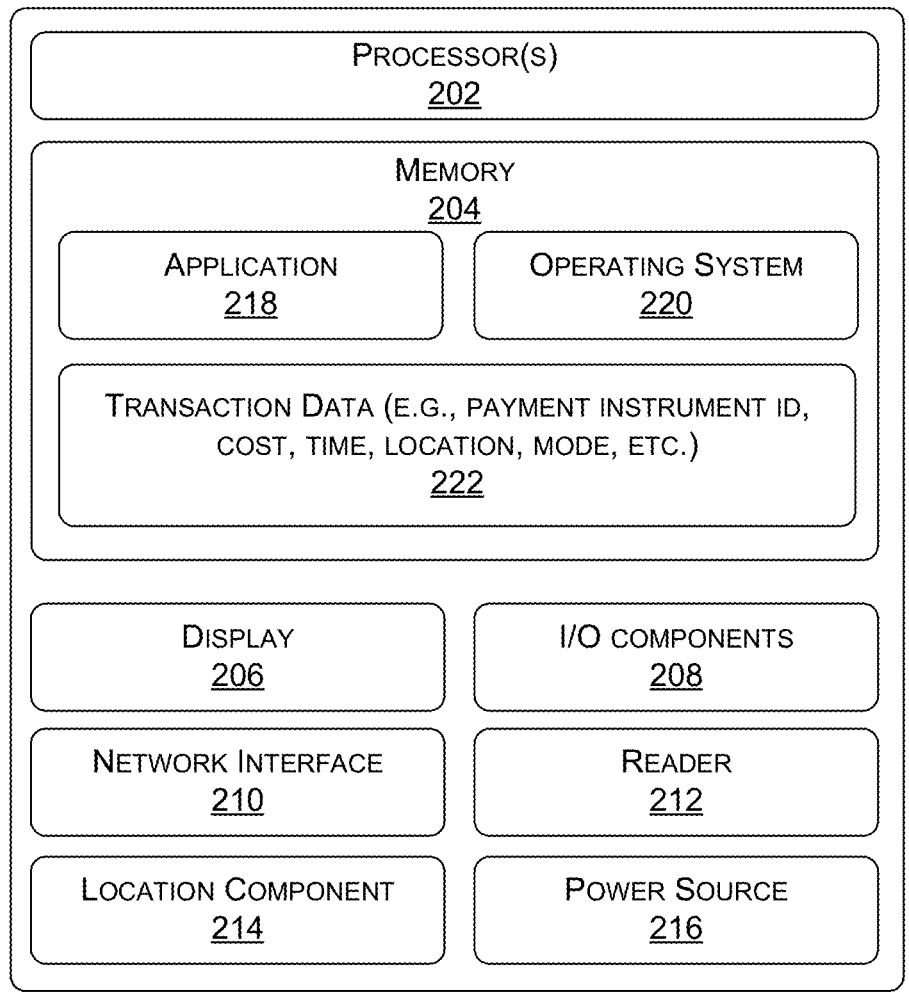
FIG. 2 illustrates example components of a merchant device.

FIG. 2 illustrates select example components of an example merchant device 200 according to some implementations. The merchant device 200 may include any of the merchant device(s) 112 from FIG. 1. The merchant device 200 may be any suitable type of computing device, e.g., mobile, semi-mobile, semi-stationary, or stationary. Some examples of the merchant device 200 may include tablet computing devices; smart phones and mobile communication devices; laptops, netbooks and other portable computers or semi-portable computers; desktop computing devices; terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the merchant device 200 includes at least one processor 202, memory 204, a display 206, one or more input/output (I/O) components 208, one or more network interfaces 210, at least one card reader 212, at least one location component 214, and at least one power source 216. Each processor 202 may itself comprise one or more processors or processing cores. For example, the processor 202 can be implemented as one or more microprocessors, microcomputers, microcontrollers, digital signal processors, central processing units, state machines, logic circuitries, and/or any devices that manipulate signals based on operational instructions. In some cases, the processor 202 may be one or more hardware processors and/or logic circuits of any suitable type specifically programmed or configured to execute the algorithms and processes described herein. The processor 202 can be configured to fetch and execute computer-readable processor-executable instructions stored in the memory 204.

Depending on the configuration of the merchant device 200, the memory 204 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 204 may include, but is not limited to, RAM, ROM, EEPROM, flash memory, solid-state storage, magnetic disk storage, optical storage, and/or other computer-readable media technology. Further, in some cases, the merchant device 200 may access external storage, such as RAID storage systems, storage arrays, network attached storage, storage area networks, cloud storage, or any other medium that can be used to store information and that can be accessed by the processor 202 directly or through another computing device or network. Accordingly, the memory 204 may be computer storage media able to store instructions, modules or components that may be executed by the processor 202. Further, when mentioned, non-transitory computer-readable media exclude media such as energy, carrier signals, electromagnetic waves, and signals per se.

The memory 204 may be used to store and maintain any number of functional components that are executable by the processor 202. In some implementations, these functional components comprise instructions or programs that are executable by the processor 202 and that, when executed, implement operational logic for performing the actions and services attributed above to the merchant device 200.

Functional components of the merchant device 200 stored in the memory 204 may include a merchant application 218, which may interact with applications executing on client devices to allow customers to pay for items offered by the merchant. The merchant application 218 may present an interface on the merchant device 200 to enable the merchant to conduct transactions, receive payments, and so forth, as well as communicating with the payment service for processing payments and sending transaction information. Further, the merchant application 218 may present an interface to enable the merchant to manage the merchant's account, and the like. Finally, the merchant application 218 may send data associated with the merchant to the payment service, and receive suggested gift card orders and values to associate with gift cards from the payment service.

Additional functional components may include the operating system 220 for controlling and managing various functions of the merchant device 200 and for enabling basic user interactions with the merchant device 200. The memory 204 may also store transaction data 222 that is received based on the merchant associated with the merchant device 200 engaging in various transactions with customers, such as customer(s) 104 from FIG. 1.

In addition, the memory 204 may also store data, data structures and the like, that are used by the functional components. For example, this data may include item information that includes information about the items offered by the merchant, which may include images of the items, descriptions of the items, prices of the items, and so forth. Depending on the type of the merchant device 200, the memory 204 may also optionally include other functional components and data, which may include programs, drivers, etc., and the data used or generated by the functional components. Further, the merchant device 200 may include many other logical, programmatic and physical components, of which those described are merely examples that are related to the discussion herein.

The network interface(s) 210 may include one or more interfaces and hardware components for enabling communication with various other devices over the network or directly. For example, network interface(s) 210 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein. In some examples, the network interface(s) 210 may be used to send various information across networks, such as network(s) 120. For instance, the network interface(s) 210 may send data such as transaction information 116 and/or employee information 118 described with respect to FIG. 1

FIG. 2 further illustrates that the merchant device 200 may include the display 206 mentioned above. Depending on the type of computing device used as the merchant device 200, the display 206 may employ any suitable display technology. For example, the display 206 may be a liquid crystal display, a plasma display, a light emitting diode display, an OLED (organic light-emitting diode) display, an electronic paper display, or any other suitable type of display able to present digital content thereon. In some examples, the display 206 may have a touch sensor associated with the display 206 to provide a touchscreen display configured to receive touch inputs for enabling interaction with a graphic interface presented on the display 206. Accordingly, implementations herein are not limited to any particular display technology. Alternatively, in some examples, the merchant device 200 may not include the display 206, and information may be present by other means, such as aurally.

The I/O components 208, meanwhile, may include speakers, a microphone, a camera, and various user controls (e.g., buttons, a joystick, a keyboard, a keypad, etc.), a haptic output device, and so forth. For instance, I/O components 208 can include a printing device for printing physical receipts for customers. In some examples, the POS device uses the printing device to print the physical receipts after receiving data representing the receipts from a payment service.

It should be noted that, in some examples, the I/O components 208 may be separate from the merchant device 200. For instance, the printing device may be separate from the merchant device 200. In some examples, the merchant device 200 sends data representing the receipts to the printing device in order to cause the printing device to print physical receipts.

In addition, the merchant device 200 may include or may be connectable to a payment instrument reader 212. In some examples, the reader 212 may plug in to a port in the merchant device 200, such as a microphone/headphone port, a data port, or other suitable port. In other instances, the reader 212 is integral with the entire merchant device 200. The reader 212 may include a read head for reading a magnetic strip of a payment card, and further may include encryption technology for encrypting the information read from the magnetic strip. Alternatively, numerous other types of card readers may be employed with the merchant device 200 herein, depending on the type and configuration of a particular merchant device 200.

The location component 214 may include a GPS device able to indicate location information, or the location component 214 may comprise another other location-based sensor. The merchant device 200 may also include one or more additional sensors (not shown), such as an accelerometer, gyroscope, compass, proximity sensor, and the like. Additionally, the merchant device 200 may include various other components that are not shown, examples of which include removable storage, a power control unit, and so forth.

Figure 3:
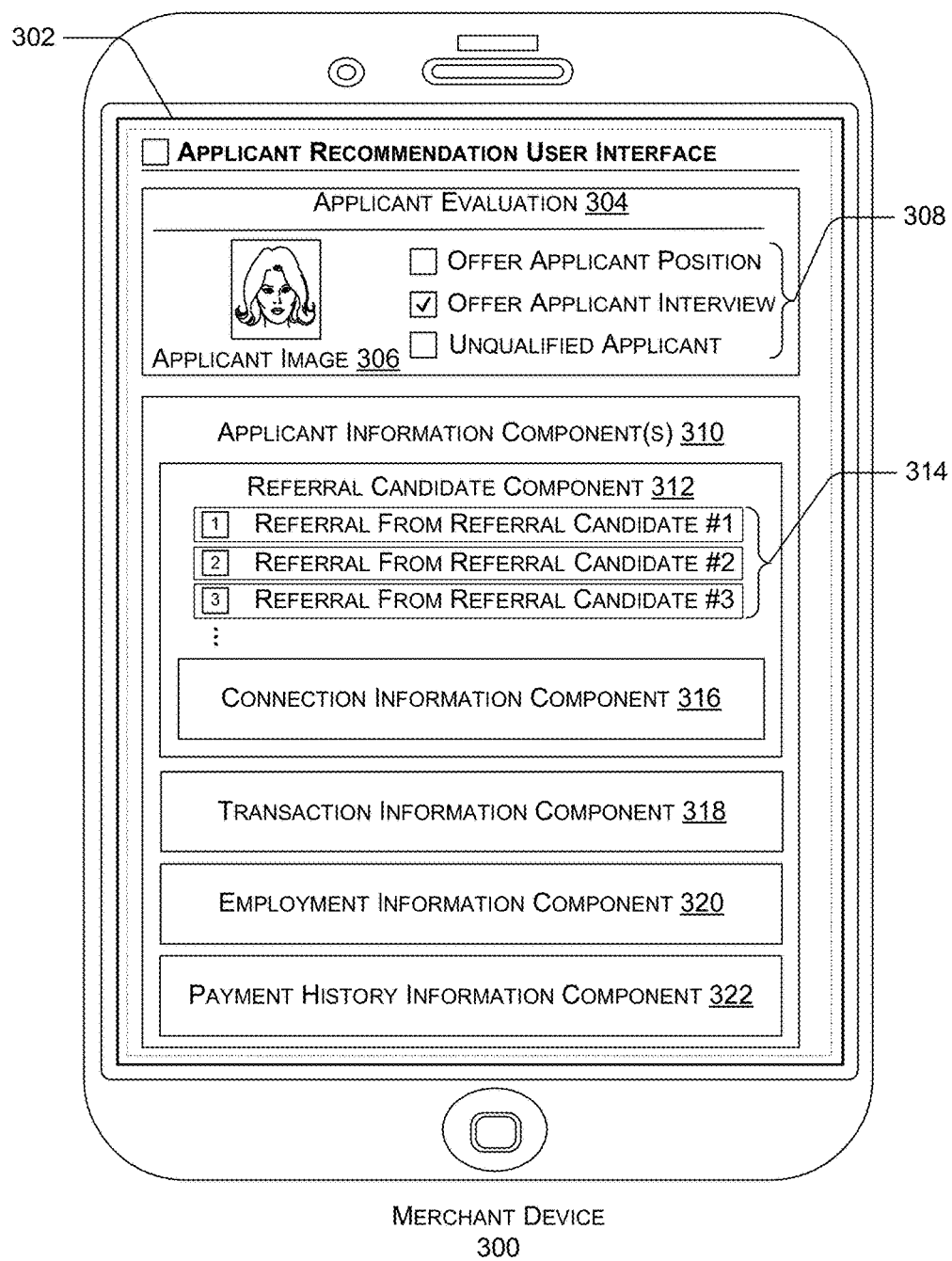
FIG. 3 illustrates an example user interface presented on a merchant device to provide information, such as referral information, regarding an applicant to help a merchant determine whether to hire the applicant.

FIG. 3 illustrates an example of a merchant device 300, which may represent the merchant device 200, providing an applicant recommendation user interface 302 that presents information to help a merchant determine whether to an applicant is a good candidate for an employment vacancy. In various examples, the applicant recommendation user interface (UI) 302 may include information sent to the merchant device 300 from the payment service 108. For instance, the information included in the applicant recommendation UI 302 may be received from the referral communication module 138.

In some examples, the applicant recommendation UI 302 includes an applicant evaluation 304 portion which presents a snapshot of whether the applicant is a good candidate for the employment vacancy. For instance, the applicant evaluation 304 may include an applicant image 306 and a suggested action 308 to take based on an analysis of the information by the payment service 108. The suggested actions may include offering the applicant the position, offering the applicant an interview, or notifying the merchant(s) 102 that the applicant is unqualified other otherwise a poor applicant for that particular employment vacancy. In some instances, the merchant device 300 may comprise a POS device and the applicant recommendation UI 302 may be presented on a display of the POS device responsive to determining that the applicant is performing a transaction with the merchant(s) 102. For example, the POS device 300 may determine that a payment card of the applicant's was swiped, and present the applicant recommendation UI 302 responsive to detecting the applicant's payment card. In this way, the applicant may be offered the position or an interview on the spot by the merchant(s) 102 or a representative of the merchant(s) 102.

In some examples, the applicant recommendation UI 302 may further include an applicant information component(s) 310. The applicant information component(s) 310 may include a referral candidate component 312 which presents referrals from referral candidates 314 along with a connection information component 316. Each of the referrals from the referral candidates 314 may be selectable by a user of the merchant device 300. Upon selection of a referral from a referral candidate 314, the text for the selected referral may be presented in a user interface on the merchant device 300. In some examples, the referrals 314 may be presented, listed, or ranked based on the amount of connections or strength of connections between the referral candidate and the applicant, as determined by the referral candidate identification module 136. For instance, the top listed referral 314 may be associated with a referral candidate having the most and/or strongest connections with the applicant. In some examples, the connection information component 316 may present the different connections between the referral candidate and the applicant. In various examples, the merchant device 300 may send all or a portion of the applicant evaluation 304 to a device associated with the applicant upon detecting the applicant's payment card. For example, the merchant device 300 may send a referral from a referral candidate 314 to the device associated with the applicant.

In various examples, the applicant recommendation UI 302 may further include a transaction information component 318, an employment information component 320, and a P2P payment history information component 322. These components may include information about the applicant which indicates whether or not the applicant is a good candidate for the employment vacancy. For instance, the transaction information component 318 may display information contained in the merchant database(s) 146 (e.g., transaction information 116) that the applicant identification module 134 found to be indicative of whether the applicant is a good candidate for the employment vacancy. Similarly, the employment information component 320 may include information from the employment database(s) 148 (e.g., employee information 118), and the payment history information component 322 may include information from the payment history database(s) 150 that the applicant identification module 134 used to determine whether the applicant is a good candidate for the employment vacancy. Thus, the applicant recommendation UI 302 may present information on a merchant device(s) 300 to a merchant(s) 102 to help a merchant identify applicants and referrals for the applicants for an employment vacancy.

Figure 4A:
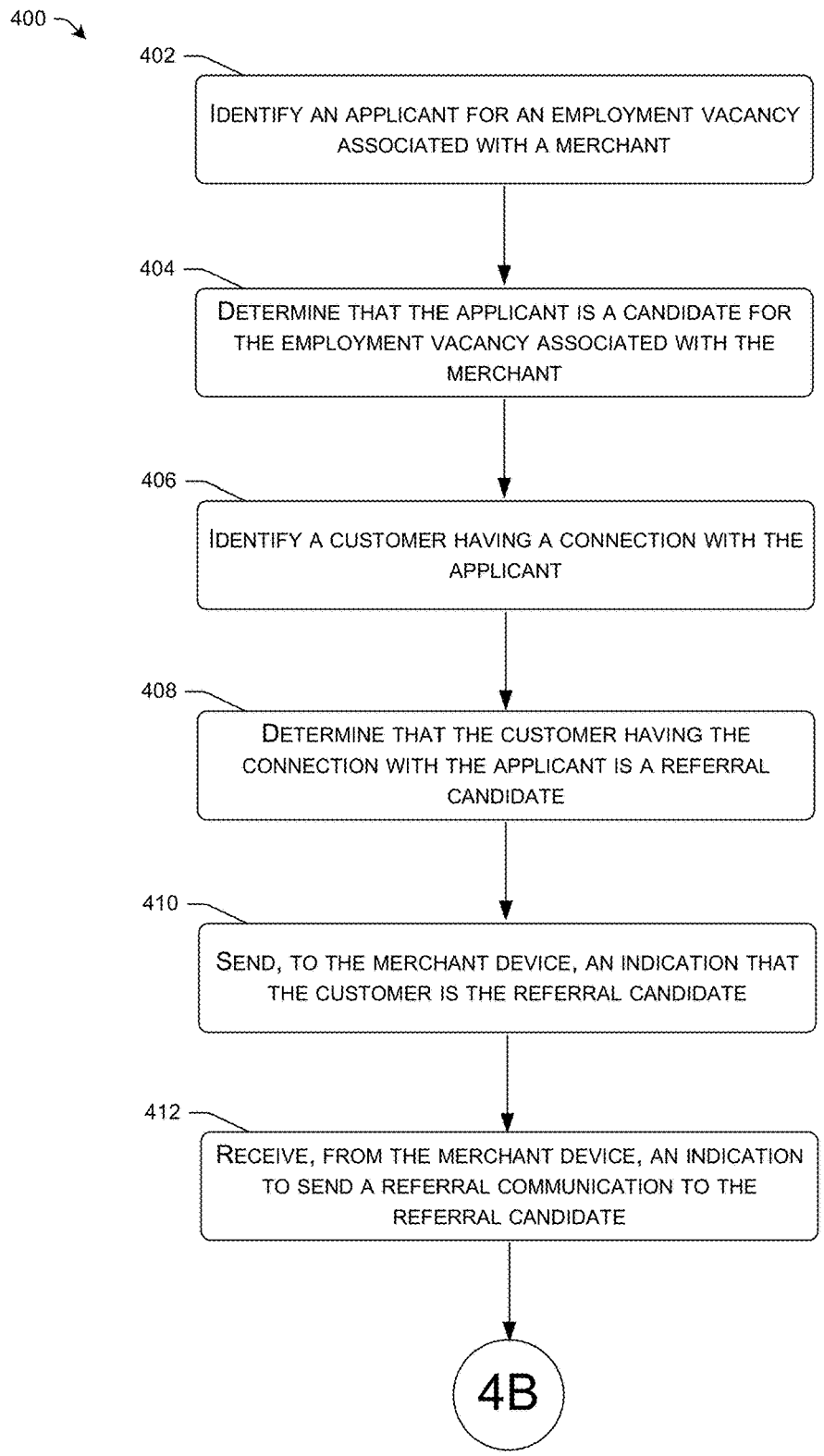
FIGS. 4A and 4B illustrate a flow diagram of an example process for identifying applicants for an employment vacancy, identifying referral candidates for the applicants, and providing a merchant with referrals for the applicant along with other data for the applicant.
Figure 4B:
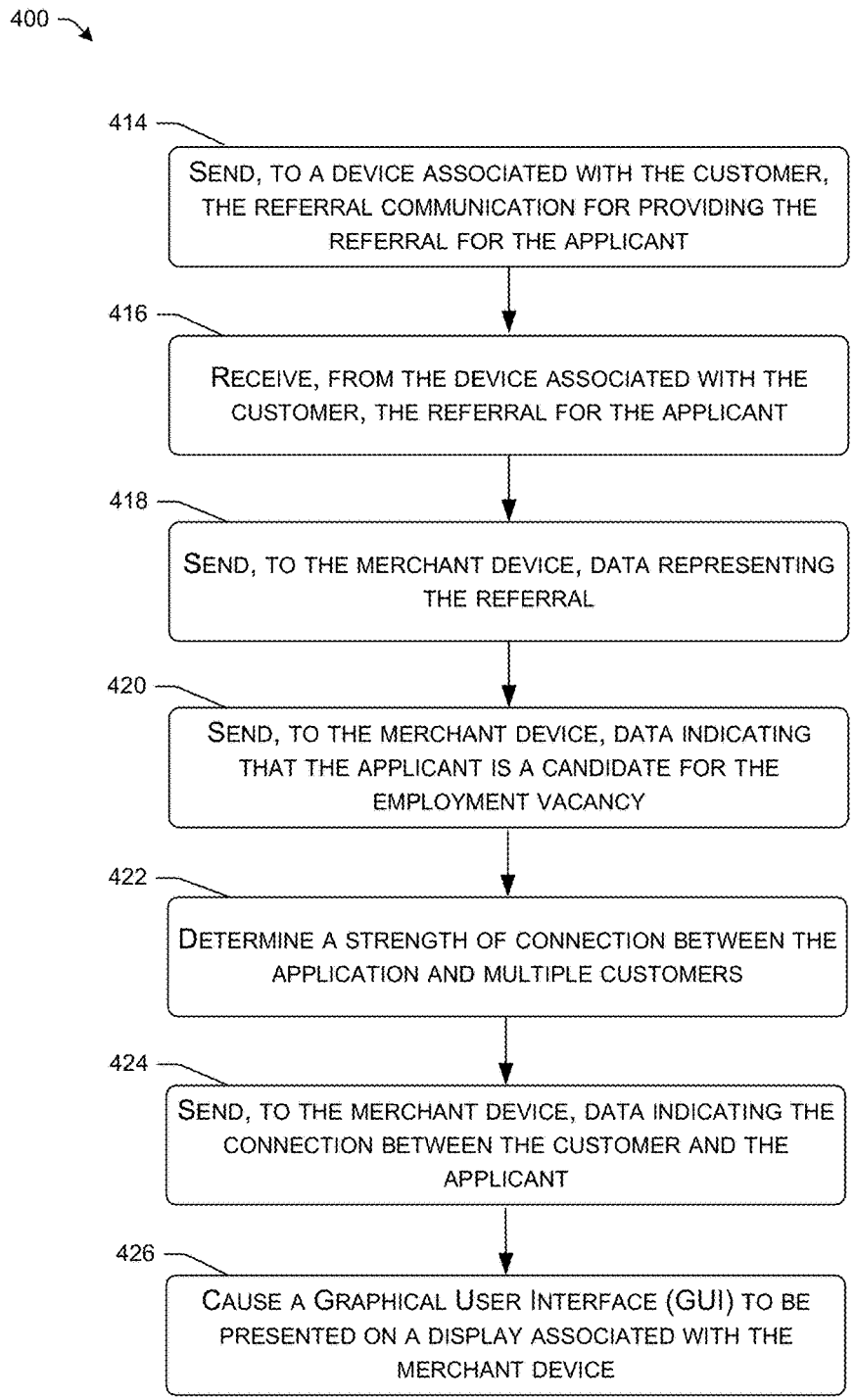

FIGS. 4A and 4B illustrate a flow diagram of an example process 400 for identifying applicants for an employment vacancy, identifying referral candidates for the applicants, and providing a merchant with referrals for the applicant along with other data for the applicant. The process 400, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 400, and other processes described herein, may be performed by a payment service, a merchant device, a customer device, an additional electronic device, or by a combination thereof.

At 402, a payment service 108 may identify an applicant for an employment vacancy associated with a merchant(s) 102. In some examples, the merchant(s) 102 may advertise employment vacancies using digital receipts for their transactions with customer(s) 104. The customer(s) 104 may provide names of applicants who may be interested in the employment vacancy. In some instances, customer(s) 104 of the merchant(s) 102 may know about the culture and business of the merchant(s) 102, and provide applicant names who would be a good fit for the employment vacancy.

At 404, the payment service 108 may determine that the applicant is a candidate for the employment vacancy associated with the merchant(s) 102. In some examples, this may comprise determining whether or not the applicant would be a good fit for the employment vacancy, or is qualified for the employment vacancy. In some instances, determining that the applicant is a candidate for the employment vacancy may include analyzing an employment history database to determine that an employment history of the applicant indicates that the applicant has previous employment experience in an industry associated with the employment vacancy, analyzing the employment history database to determine that the employment history of the applicant indicates that the applicant has had less than a threshold amount of jobs (e.g., 1 or 2) for a predetermined period of time (e.g., a year, 2 years, etc.), analyzing the employment history database to identify positive performance evaluations associated with a prior job of the applicant, analyzing a payment history database to determine that the applicant performs purchase transactions at a time of a day corresponding to shift hours associated with the employment vacancy, analyzing the payment history database to determine that the applicant includes a tip amount in the purchases higher than a threshold tip amount, and/or analyzing the payment history database to identify multiple purchase transactions between the applicant and merchants in an industry associated with the employment vacancy.

At 406, the payment service 108 may identify a customer (or other individual) having a connection with the applicant. In some examples, the payment service 108 may identify the customer having the connection by analyzing a payment history database of a payment service to identify a payment made between the applicant and the customer. In various examples, the payment service 108 may analyze the merchant transaction database to determine that the applicant and the customer have each made payments within a threshold period of time at a same merchant location more than a threshold amount of times. Further, the payment service 108 may identify the customer having the connection with the applicant by analyzing the employment history database comprising employment histories to identify a common place of employment between the customer and applicant, or analyzing the employment history database and the merchant transaction database to determine that (i) the applicant is an employee at a location at which the customer has made a transaction, or (ii) the customer is an employee at a location at which the applicant has made a transaction.

At 408, the payment service 108 may determine that the customer(s) 104 having the connection with the applicant is a referral candidate. In some examples, determining that the customer(s) 104 is a referral candidate may be based on a strength of the connection between the customer(s) 104 and the applicant, or a number of different connections the applicant the customer(s) 104 have with each other. In some instances, determining that the customer(s) 104 having the connection with the applicant is a referral candidate may include at least one of determining that a length of time from when the connection between the customer(s) 104 and the applicant was formed is higher than a threshold length of time, determining that the connection comprises an employment connection based on employment histories associated with the customer(s) 104 and the applicant, determining that the customer(s) 104 has employment experience in an industry associated with the employment vacancy, determining an amount of time the customer(s) 104 has had employment experience in the industry associated with the employment vacancy, or determining that the customer(s) 104 was a former/current boss of the applicant.

At 410, the payment service 108 may send, to the merchant device, an indication that the customer is the referral candidate. At 412, the payment service 108 may receive, from the merchant device, an indication to send a referral communication to the referral candidate.

As shown in FIG. 4B, the process 400 continues to 414. At 414, the payment service sends, to a device (e.g., customer device(s) 146) associated with the customer(s) 104, the referral communication for providing the referral for the applicant. In some examples, the referral communication may include an indication of who the applicant is, a description of the employment vacancy and/or merchant(s) 102, and a prompt to provide a referral for the candidate.

At 416, the payment service 108 may receive, from the device associated with the customer(s) 104, the referral for the applicant. At 418, the payment service 108 may send, to the merchant device(s) 112, data representing the referral.

At 420, the payment service 108 may send, to the merchant device(s) 112, data indicating that the applicant is a candidate for the employment vacancy. The data indicating that the applicant is a candidate for the employment vacancy may comprise data used to determine that the applicant is the candidate for the employment vacancy at 404.

At 422, the payment service 108 may determine a strength of connection between the applicant and one customer(s) 104, or for each of multiple customer(s) 104. In some examples, the payment service 108 may rank the multiple customer(s) 104 based on the strength of connection determined for each one.

At 424, the payment service 108 may send, to the merchant device(s) 112, data indicating the connection between the customer(s) 104 and the applicant. In some examples, the data indicating the connection between the customer(s) 104 and the applicant may comprise data used to identify the customer having the connection with the applicant at 406 and/or the data used to determine that the customer having the connection with the applicant is a referral candidate 408. In some instances, the data may include the rankings for each customer(s) 104, such as a list of ranks.

At 426, the payment service 108 may cause a graphical user interface (GUI) to be presented on a display associated with the merchant device. In some examples, the GUI may correspond to the applicant recommendation UI 302 and present data similar to that shown in FIG. 3. For instance, the GUI may present an applicant evaluation 304, a referral candidate component 312, connection information component 316, a transaction information component 318, an employment information component 320, and a payment history information component 322.

It should be noted that, although the processes described above discuss storing and analyzing inventories associated with merchants, similar processes can be performed by storing and analyzing catalogs associated with merchants.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system for identifying a candidate via a payment processing service comprising:
    a point-of-sale (POS) terminal associated with a particular merchant of a plurality of merchants and configured to collect data associated with transactions between the particular merchant and customers of the particular merchant and send the data to a payment processing service; and
    one or more computing devices of the payment processing service, comprising:
        one or more processors;
        a merchant transaction database storing data associated with a plurality of transactions between individual merchants of the plurality of merchants and respective customers of a plurality of customers;
        an employment history database storing data associated with employment histories for employees of the plurality of merchants; and
        a peer-to-peer payment history database storing data associated with payments between individual customers of the plurality of customers;
        one or more computer-readable media storing instructions that, when executed by the one or more processors, cause the one or more processors to perform operations comprising:
            receiving, from a merchant device associated with the particular merchant, an indication of an applicant for an employment vacancy at a location of the particular merchant;
            accessing the merchant transaction database to identify the data associated with the transactions between the particular merchant and the plurality of customers;
            identifying a subset of the plurality of customers having a connection with the applicant for the employment vacancy, the identifying comprising at least one of:
                analyzing the peer-to-peer payment history database to identify a payment made between the applicant and a particular customer of the plurality of customers;
                analyzing the merchant transaction database to determine that the applicant and a particular customer, of the plurality of customers, have each made payments within a threshold period of time at a same merchant location more than a threshold amount of times;
                analyzing the employment history database comprising employment histories to identify a common place of employment between a particular customer, of the plurality of customers, and the applicant; or
                analyzing the employment history database and the merchant transaction database to determine that (i) the applicant is an employee at a location at which a particular customer, of the plurality of customers, has conducted a transaction, or (ii) a particular customer, of the plurality of customers, is an employee at a location at which the applicant has conducted a transaction;
            determining, based at least in part on identifying the subset of the plurality of customers having the connection, that multiple customers, of the subset of the plurality of customers, are candidates for providing referrals for the applicant;
            determining a strength of connection between the applicant and each of the multiple customers;
            ranking the multiple customers based at least in part on the strength of connection determined for each of the multiple customers;
            sending, to the merchant device, data representing ranks of the multiple customers as candidates;
            receiving, from the merchant device, an indication to send a referral communication to at least one of the multiple customers; and
            sending, to a device associated with the at least one of the multiple customers, the referral communication for providing the referral for the applicant.

2. The system of claim 1, wherein determining that the multiple customers are candidates comprises at least one of:
 determining that a length of time from when the connection between a customer, of the multiple customers, and the applicant was formed is higher than a threshold length of time;
 determining that the connection comprises an employment connection based on employment histories of a customer, of the multiple customers, and the applicant;
 determining, based at least in part on analyzing the employment history database, that a customer, of the multiple customers, has employment experience in an industry associated with the employment vacancy;
 determining, based at least in part on analyzing the employment history database, an amount of time a customer, of the multiple customers, has had employment experience in the industry associated with the employment vacancy; or
 determining, based at least in part on analyzing the employment history database, that a customer, of the multiple customers, was a boss of the applicant.

3. The system of claim 1, the operations further comprising determining that the applicant is a qualified applicant for the employment vacancy, the determining that the applicant is a qualified applicant comprising at least one of:
 analyzing the employment history database to determine that an employment history of the applicant indicates that the applicant has previous employment experience in an industry associated with the employment vacancy;
 analyzing the employment history database to determine that the employment history of the applicant indicates that the applicant had less than a threshold amount of jobs during a predetermined period of time;
 analyzing the employment history database to identify positive performance evaluations associated with a prior job of the applicant;
 analyzing the merchant transaction database to determine that the applicant performs purchase transactions at a time of a day corresponding to shift hours associated with the employment vacancy;
 analyzing the merchant transaction database to determine that the applicant includes a tip amount in the purchases higher than a threshold tip amount; or
 analyzing the merchant transaction database to identify multiple purchase transactions between the applicant and merchants in an industry associated with the employment vacancy.

4. The system of claim 1, the operations further comprising:
 receiving, from a device associated with a customer, of the multiple customers, the referral for the applicant;
 sending, to the merchant device or the POS terminal, the referral and data representing the connection; and
 causing a graphical user interface (GUI) to be presented on a display associated with the merchant device or the POS terminal, the GUI including the referral and the data representing the connection.

5. A computer-implemented method for identifying a candidate, the method comprising:
 receiving, via a payment processing server, transaction data associated with at least one of (i) transactions performed between one or more devices associated with one or more merchants and one or more devices associated with one or more customers or (ii) a payment transaction involving a user;
 identifying, via the payment processing server, an applicant for an employment vacancy associated with a merchant of the one or more merchants;
 analyzing, via the payment processing server, the transaction data to identify the user, having a connection with the applicant, the identifying the user having the connection comprising at least one of:
  determining that the applicant and the user have each made payments within a threshold period of time at a same merchant location more than a threshold amount of times; or
  determining that the payment transaction was between the user and the applicant;
 determining, via the payment processing server, that the user is a candidate for providing a referral for the applicant; and
 sending, to a device associated with the user via the payment processing server, a referral communication to enable the user to provide the referral for the applicant.

6. The computer-implemented method of claim 5, further comprising receiving, from the one or more devices associated with the one or more merchants, employee history data for employees of the one or more merchants, wherein identifying the user having the connection with the applicant further comprises at least one of:
 analyzing the employee history data for the employees of the one or more merchants to identify a common place of employment between the applicant and the user; or
 analyzing the employment history data and the transaction data to determine that (i) the applicant is an employee at a location at which the user has conducted a transaction, or (ii) the user is an employee at a location at which the applicant has conducted a transaction.

7. The computer-implemented method of claim 5, wherein identifying the user having the connection with the applicant further comprises analyzing geolocation information for a first device associated with the user and for a second device associated with the applicant to determine that the first device and the second device were within a threshold proximity of each other more than a threshold amount of times.

8. The computer-implemented method of claim 5, further comprising:
 receiving, from the device associated with the user, the referral for the applicant; and
 sending, to a device associated with the merchant, data representing the referral for the applicant.

9. The computer-implemented method of claim 8, further comprising:
 sending data representing the connection between the user and the applicant; and
 causing a graphical user interface (GUI) to be presented on a display associated with a merchant device, the GUI comprising a representation of the referral and the data representing the connection between the user and the applicant.

10. A system comprising:
 one or more processors;
 one or more databases; and
 one or more computer-readable media storing instructions that, when executed by the one or more processors, cause the one or more processors to perform operations comprising:
  receiving, from one or more devices associated with one or more merchants, employee history data for employees of the one or more merchants;

storing the employee history data in the one or more databases;

identifying an applicant for an employment vacancy associated with a merchant of the one or more merchants;

identifying a user, from the employees, having a connection with the applicant, the identifying the user having the connection comprising at least one of:

analyzing the employee history data to identify a common place of employment between the applicant and the user; or analyzing the employee history data to determine that (i) the applicant is an employee at a location at which the user has conducted a transaction, or (ii) the user is an employee at a location at which the applicant has conducted a transaction;

determining, based at least in part on information stored in the one or more databases, that the user is a candidate for providing a referral for the applicant;

sending, to a user device associated with the user, a referral communication for providing the referral for the applicant;

receiving, from the user device associated with the user, the referral for the applicant; and sending, to a merchant device associated with the merchant, data representing the referral.

11. The system of claim 10, the operations further comprising receiving, from the one or more devices associated with the one or more merchants, transaction data associated with transactions between the one or more merchants and one or more customers, wherein identifying the user having the connection with the applicant further comprises at least one of:

analyzing the information in the one or more databases to determine that the applicant and the user have each made payments within a threshold period of time at a same merchant location more than a threshold amount of times; or analyzing the information in the one or more databases to identify a payment made between the user and the applicant.

12. The system of claim 10, wherein the user comprises a first user, the referral comprises a first referral, and the connection comprises a first connection, the operations further comprising:

identifying a second user having a second connection with the applicant;

sending, to a user device associated with the second user, a referral communication for providing a second referral for the applicant;

receiving, from the user device associated with the second user, the second referral for the applicant; and sending, to the merchant device associated with the merchant, data representing the second referral.

13. The system of claim 12, the operations further comprising:

determining that the first connection between the first user and the applicant is stronger than the second connection between the second user and the applicant;

causing a graphical user interface (GUI) to be presented on a display associated with the merchant device, the GUI including a first listing associated with the first referral and a second listing associated with the second referral; and causing the first listing to be presented higher on the GUI than the second listing based at least in part on the first connection being stronger than the second connection.

14. The system of claim 13, wherein the GUI further includes an indication of a suggested action for the merchant to take, the suggested action comprising at least one of hiring the applicant for the employment vacancy, offering the applicant an interview for the employment vacancy, or not hiring the applicant for the employment vacancy.

15. The system of claim 10, wherein identifying the applicant for the employment vacancy associated with the merchant comprises at least one of:

analyzing the one or more databases to determine that an employment history of the applicant indicates that the applicant has previous employment experience in an industry associated with the employment vacancy;

analyzing the one or more databases to determine that the employment history of the applicant indicates that the applicant had less than a threshold amount of jobs during a predetermined period of time; or analyzing the one or more databases to identify one or more positive performance evaluations associated with a prior job of the applicant.

16. The system of claim 10, wherein identifying the applicant for the employment vacancy associated with the merchant comprises at least one of:

analyzing the one or more databases to determine that the applicant includes a tip amount in previous purchases higher than a threshold tip amount; or analyzing the one or more databases to identify multiple purchase transactions between the applicant and merchants, of the plurality of merchants, in an industry associated with the employment vacancy.

17. The system of claim 10, the operations further comprising, prior to sending the referral communication to the user device associated with the user:

sending, to the merchant device, an indication that the user is a candidate; and receiving, from the merchant device, an indication to send the referral communication to the user device associated with the user.

18. The computer-implemented method of claim 5, wherein determining that the user is a candidate for providing the referral for the applicant comprises at least one of:

determining that a length of time from when the connection between the user and the applicant was formed is higher than a threshold length of time;

determining that the connection comprises an employment connection based on employment histories of the user and the applicant;

determining that the user has employment experience in an industry associated with the employment vacancy; or determining an amount of time the user has had employment experience in the industry associated with the employment vacancy.

19. The computer-implemented method of claim 5, wherein the user comprises a first user, the referral comprises a first referral, and the connection comprises a first connection, further comprising:

identifying a second user having a second connection with the applicant;

sending, to a user device associated with the second user, another referral communication for providing a second referral for the applicant;

receiving, from the user device associated with the second user, the second referral for the applicant; and sending, to a merchant device associated with the merchant, data representing the second referral.

20. The system of claim 10, wherein identifying the user having the connection with the applicant further comprises analyzing geolocation information for a first device associated with the user and for a second device associated with the applicant to determine that the first device and the second device were within a threshold proximity of each other more than a threshold amount of times.

* * * * *